United States Patent
Chen et al.

(10) Patent No.: US 8,610,680 B2
(45) Date of Patent: Dec. 17, 2013

(54) TOUCH SCREEN FLAT PANEL DISPLAY

(75) Inventors: Qiliang Chen, Shenzhen (CN); Haiping Liu, Shenzhen (CN); Meiying Chen, Shenzhen (CN)

(73) Assignee: Solution Depot (Shenzhen) Limited, Shenzhen (CN)

( * ) Notice: Subject to any disclaimer, the term of this patent is extended or adjusted under 35 U.S.C. 154(b) by 142 days.

(21) Appl. No.: 13/005,203

(22) Filed: Jan. 12, 2011

(65) Prior Publication Data

US 2011/0102360 A1 May 5, 2011

Related U.S. Application Data

(63) Continuation of application No. PCT/CN2009/072725, filed on Jul. 10, 2009.

(30) Foreign Application Priority Data

Jul. 21, 2008 (CN) .......................... 2008 1 0133417

(51) Int. Cl.
*G09G 5/00* (2006.01)
(52) U.S. Cl.
USPC ........................................ 345/173; 178/18.03
(58) Field of Classification Search
USPC .................. 345/173–17, 173–174, 179, 182; 178/18.01–20.04
See application file for complete search history.

(56) References Cited

U.S. PATENT DOCUMENTS

| | | | | |
|---|---|---|---|---|
| 5,854,881 A * | 12/1998 | Yoshida et al. | ............... | 345/104 |
| 5,940,064 A * | 8/1999 | Kai et al. | ........................ | 345/173 |
| 6,239,788 B1 | 5/2001 | Nohno et al. | | |
| 7,075,521 B2 * | 7/2006 | Yamamoto et al. | ........... | 345/173 |
| 2004/0130533 A1 * | 7/2004 | Lin | ................................ | 345/173 |
| 2006/0262100 A1 * | 11/2006 | Van Berkel | ................... | 345/173 |
| 2008/0062139 A1 | 3/2008 | Hotelling et al. | | |
| 2008/0309627 A1 * | 12/2008 | Hotelling et al. | ............. | 345/173 |

FOREIGN PATENT DOCUMENTS

| | | |
|---|---|---|
| CN | 1678980 | 10/2005 |
| CN | 1716018 | 1/2006 |
| CN | 1940842 | 4/2007 |
| CN | 2927238 | 7/2007 |
| CN | 101017419 | 8/2007 |

(Continued)

OTHER PUBLICATIONS

English Translation of CN 101017419.*

(Continued)

*Primary Examiner* — Hong Zhou
(74) *Attorney, Agent, or Firm* — Hamre, Schumann, Mueller & Larson, P.C.

(57) ABSTRACT

A touch screen flat panel display (FPD) is provided, which includes a display screen, a display driving circuit, a touch system circuit, and the like. Related circuits in the touch screen FPD enable electrodes of the display screen to transmit display driving signals as well as touch signals, that is to say, the display driving and the touch detection multiplex the electrodes of the display screen, such that the FPD is not only used for normal display but also used for realizing touch detection. By applying the touch signal simultaneously to detecting lines and non-detecting lines, the flow of the touch signal between the detecting lines and between the detecting line and the non-detecting line is reduced, thus controlling the flow direction of the touch signal, and increasing the accuracy of determining touched electrodes.

16 Claims, 6 Drawing Sheets

(56) References Cited

FOREIGN PATENT DOCUMENTS

| | | |
|---|---|---|
| CN | 101187845 | 5/2008 |
| CN | 201285539 | 8/2009 |
| EP | 1455264 | 9/2004 |
| JP | 2007200039 | 8/2007 |
| WO | 2007/022259 | 2/2007 |
| WO | 2008/032476 | 3/2008 |

OTHER PUBLICATIONS

International Search Report for international application No. PCT/CN2009/072725, dated Oct. 22, 2009 (1 page).

Supplementary European Search Report for application No. 09799970, dated Nov. 5, 2012 (6 pages).

* cited by examiner

TOUCH SCREEN FLAT PANEL DISPLAY

BACKGROUND OF THE INVENTION

1. Field of Invention

The present invention relates to a touch screen and a flat panel display (FPD), and more particularly, to a touch screen FPD.

2. Related Art

Currently, capacitive touch screens are classified into digital capacitive touch screens and analog capacitive touch screens. The digital capacitive touch screen is composed of two layers of electrodes each having a plurality of parallel electrodes, and the two layers of electrodes are orthogonal to each other. A touch excitation signal is applied to each electrode, and when a finger of a human touches the touch screen, the finger forms a coupling capacitor with some electrodes on the touch screen, and a leakage current flows from the coupling capacitor. The touch system circuit determines two orthogonal electrodes forming the coupling capacitor with the finger on the two layers of electrodes through detecting the leakage current, thus determining the position of the touch. However, this method is only adapted to rough positioning, and when it intends to perform fine positioning, two layers of fine and close electrodes are required, which, however, has a high cost. Moreover, when the digital capacitive touch screen is disposed in front of the display, reflection generated by sensing lines causes a nonuniform display.

The analog capacitive touch screen can be classified into tow types, namely, the analog capacitive touch screen having a single layer of sensing line and having two layers of sensing lines. The analog capacitive touch screen having a single layer of sensing line inputs touch excitation current signals to the electrode from four corners of the single-layered electrode, and when a finger of a human touches the touch screen, a coupling capacitor is formed by the finger and the electrode, and a leakage current flows from the coupling capacitor. The touch system circuit determines through calculation the touch position where the current flows from the finger through detecting magnitudes of the current respectively flowing from the four corners to the electrode. This method can realize the fine positioning, however, the control circuit requires a large calculation amount, and when the ambient temperature and humidity change so as to change the ambient electric field, drift occurs, thus causing inaccurate positioning. When the touch screen is disposed in front of the display, inadequate transmission of the sensing lines of the touch screen reduces the brightness of the display screen, and reflection generated by the sensing lines of the touch screen further reduces the display contrast under strong ambient light.

The analog capacitive touch screen having two layers of sensing lines is composed of two layers of electrodes each having a plurality of parallel electrodes, and the two layers of electrodes are orthogonal to each other. A touch excitation signal is applied to each electrode, and when a finger of a human touches the touch screen, the finger forms a coupling capacitor with some electrodes on the touch screen, and a leakage current flows from the coupling capacitor. The touch system circuit obtains through calculation touch positions in horizontal or longitudinal direction respectively on the two layers of electrodes orthogonal to each other by detecting magnitude of the current flowing from each electrode. This method can realize the fine positioning, and also alleviate the drift problem. However, the two layers of sensing lines must be detected one by one for detecting the leakage current, so a large detection and calculation amount is required, and time spent for detection and calculation is also increased along with the increase of the size of the screen and the increase of the sensing lines. When the touch screen is disposed in front from the display, reflection generated by the sensing lines of the touch screen results in a non-uniform display, as well as a reduced display contrast under strong ambient light.

Patent No. CN1678980 entitled "Touch Sensing" has disclosed a method using electrodes of a matrix FPD as touch sensors, such that the FPD has the function of sensing touch. However, in this method, electrodes of the FPD have introduction ends disposed at one side to be connected to a display driving circuit and have introduction ends disposed at the opposite side to be connected to a touch system circuit, such that the electrodes of the display communicate with the display driving circuit or the touch system circuit at different times, and the electrodes of the display serve as sensing lines to sense the touch. The method of introducing leads from two ends of the column electrodes and the row electrodes to be respectively connected to the display driving circuit and the touch system circuit greatly increases the density and complexity of the introduction leads, thus increasing the cost and reducing the reliability.

Patent application No. 2006100948141 entitled "Touch Screen Flat Panel Display" has disclosed a connection mode between a touch system circuit and electrodes of a display screen, in which an analog switch is used to enable the electrodes of the display screen to transmit display driving signals, or transmit and sense touch signals, such that display driving and touch detection time-division multiplex the electrodes of the display screen, and the electrodes of the display screen are used for display driving as well as touch detection. Patent application No. 2006101065583 entitled "Planar Display Device with Touch Controllable Function" has disclosed another connection mode between a touch system circuit and electrodes of a display screen, in which a signal loading and merge circuit enables the electrodes of the display screen to transmit display driving signals and transmit and sense touch signals simultaneously, such that display driving and touch detection share the electrodes of the display screen simultaneously, and the electrodes of the display screen are used for display driving as well as touch detection. The disclosed modes make the connection of the touch system circuit and the electrodes of the display screen reasonable, and even skillfully utilize selection and output circuit parts in the display driving circuit, such that the connection between the touch system circuit and the electrodes of the display screen becomes simple and feasible.

In the above patents, a touch excitation signal is applied to electrodes of the display screen one by one in a scan addressing mode, so as to detect touch on the electrodes one by one in the row direction and the column direction. Row and column electrodes of the flat panel display screen are intersected to form a mesh-like structure, and the touch excitation signal applied to one electrode series-flows among the mesh-like electrodes of the flat panel display screen, thus influencing the determination to the touched electrodes.

SUMMARY OF THE INVENTION

The present invention aims to control the flow direction of a touch signal among mesh-like electrodes of a display screen, and thus a series of methods of applying touch excitation on electrodes of a display screen and methods of detecting touch are provided.

Technical problems of the present invention are solved through the following technical solutions.

The present invention provides a touch screen FPD, which includes a display screen, a display driving circuit, a touch system circuit, and a multiplexer or signal loading and merge circuit enabling electrodes of the display screen to be used for display driving as well as touch detection. The multiplexer enables the electrodes of the display screen to be communicated with the display driving circuit so as to transmit display driving signals or to be communicated with the touch system circuit so as to transmit touch signals, and the display driving and the touch detection time-division multiplex the electrodes of the display screen. The signal loading and merge circuit enables the electrodes of the display screen to transmit the display driving signals and the touch signals simultaneously, and the display driving and the touch detection share the electrodes of the display screen simultaneously. The present invention is characterized in that: during the period when the electrodes of the display screen transmit the touch signals, the touch signal is applied to more than two electrode lines of the display screen at least one moment, and the touch system circuit selects at least one electrode line of the display screen having shielding protection as a detecting line from them; the detecting line also detects a change of the touch signal flowing through the electrode when being applied with the touch signal; the electrode line of the display screen having the shielding protection refers to the electrode line of the display screen having electrode lines at two adjacent sides or two non-adjacent sides applied with the touch signal or electrode lines intersected with the electrode line and applied with the touch signal.

Technical problems of the present invention can be further solved through the following preferred or optional technical solutions.

In one embodiment of the present invention, the electrode lines of the display screen are all electrodes of the display screen including row electrode lines and column electrode lines of a passive display screen, or row electrode lines and column electrode lines of an active display screen.

In another embodiment of the present invention, during the period that the touch signal is applied to the electrodes of the display screen, when applying the touch signal to the detecting line and detecting the change of the touch signal flowing through the detecting line, the touch signal is also applied to other electrodes of the display screen being intersected with the detecting line; and the other electrodes of the display screen being intersected with the detecting line are all electrodes being intersected with the detecting line or a part of the electrodes being intersected with the detecting line.

In another embodiment of the present invention, during the period that the touch signal is applied to the electrodes of the display screen, when applying the touch signal to the detecting line and detecting the change of the touch signal flowing through the detecting line, the touch signal is also applied to other electrodes of the display screen not intersected with the detecting line; and the other electrodes of the display screen not intersected with the detecting line are all electrodes not intersected with the detecting line or a part of the electrodes not intersected with the detecting line.

In another embodiment of the present invention, during the period that the touch signal is applied to the electrodes of the display screen, when applying the touch signal to the detecting line and detecting the change of the touch signal flowing through the detecting line, the touch signal is also applied to other electrodes of the display screen being or not intersected with the detecting line; and the other electrodes of the display screen being or not intersected with the detecting line are all electrodes being or not intersected with the detecting line or a part of the electrodes being or not intersected with the detecting line.

In another embodiment of the present invention, during the period that the touch signal is applied to the electrodes of the display screen, when applying the touch signal to the detecting line and detecting the change of the touch signal flowing through the detecting line, the touch signal is also applied to a common electrode of the display screen.

In another embodiment of the present invention, the touch signal is an alternating current (AC) signal including zero amplitude or a direct current (DC) signal including zero potential.

In another embodiment of the present invention, the touch signals applied to the electrodes have the same amplitude, phase, frequency, or code.

In another embodiment of the present invention, the touch signals applied to the electrodes have at least one of different amplitudes, different phases, different frequencies, or different codes.

In another embodiment of the present invention, when the touch system circuit selects the detecting lines, the touch system circuit selects a part of the electrode lines of the display screen at the same time as a group of detecting lines.

In another embodiment of the present invention, when the touch system circuit selects the detecting lines, the touch system circuit selects two or more parts of the electrode lines of the display screen at the same time as two or more groups of detecting lines respectively, the touch signals are applied to each group of detecting lines simultaneously, and the changes of the touch signals flowing through each group of detecting lines are detected.

In another embodiment of the present invention, the touch system circuit selects the detecting lines in a scanning manner, and selects different parts of the electrode lines of the display screen at different times as the detecting lines.

In another embodiment of the present invention, the touch signals applied to the groups of detecting lines have the same amplitude, phase, frequency, or code.

Or, the touch signals applied to the groups of detecting lines have at least one of different amplitudes, different phases, different frequencies, or different codes.

In another embodiment of the present invention, each group of detecting lines is composed of one or more electrode lines of the display screen.

The multiplexer enables the electrodes of the display screen to be communicated with the display driving circuit so as to transmit the display driving signals or to be communicated with the touch system circuit so as to transmit the touch signals, and the multiplexer may be a multiple way analog switch or another circuit functions as a multiplexer.

The row signal loading and merge circuit synthesizes a display driving signal generated by a row display driving circuit and a touch signal having different features with the display driving signal and generated by the touch system circuit into a driving signal having a touch recognition feature, and then applies the driving signal to the electrodes of the display screen.

As compared with the conventional art, the present invention has the following advantages.

The present invention increases the accuracy of determining positions of touch points. In the present invention, the touch screen FPD applies the touch signal simultaneously to the detecting lines and the non-detecting lines, so as to reduce the flow of the touch signal between the detecting lines and between the detecting line and the non-detecting line, thus controlling the flow direction of the touch signal, and increasing the accuracy of determining touched electrodes.

In the present invention, the touch signal is applied to a plurality of groups of detecting lines at the same time, and changes of the touch signals flowing through each group of detecting lines are detected respectively, which equivalent to dividing the display screen into several blocks and performing touch detection on the blocks simultaneously. When performing touch detection through scanning, this method of scanning the blocks of a plurality of groups of detecting lines at the same time shortens the time spent for detecting touch points on the whole display screen.

Amplitudes, phases, frequencies, or codes of the touch signals applied to the detecting lines may be adjusted to be different, and amplitudes, phases, frequencies, or codes of the touch signals applied to the non-detecting line may also be adjusted to be different from the amplitudes, phases, frequencies, or codes of the touch signals applied to the detecting lines, thus controlling the flow direction of the touch signal more finely.

As for the conditions of determining the touched electrode line, an electrode line having the largest change of the touch signal flowing therethrough and exceeding a certain set threshold is detected as a touched electrode line, and the touch screen FPD adopts single touch. Moreover, electrode lines having the changes of the touch signals flowing therethrough exceeding a certain set threshold are detected as touched electrode lines, and thus the touch screen FPD of the present invention allows multi-touch, which facilitates the touch screen FPD to add more touch functions.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
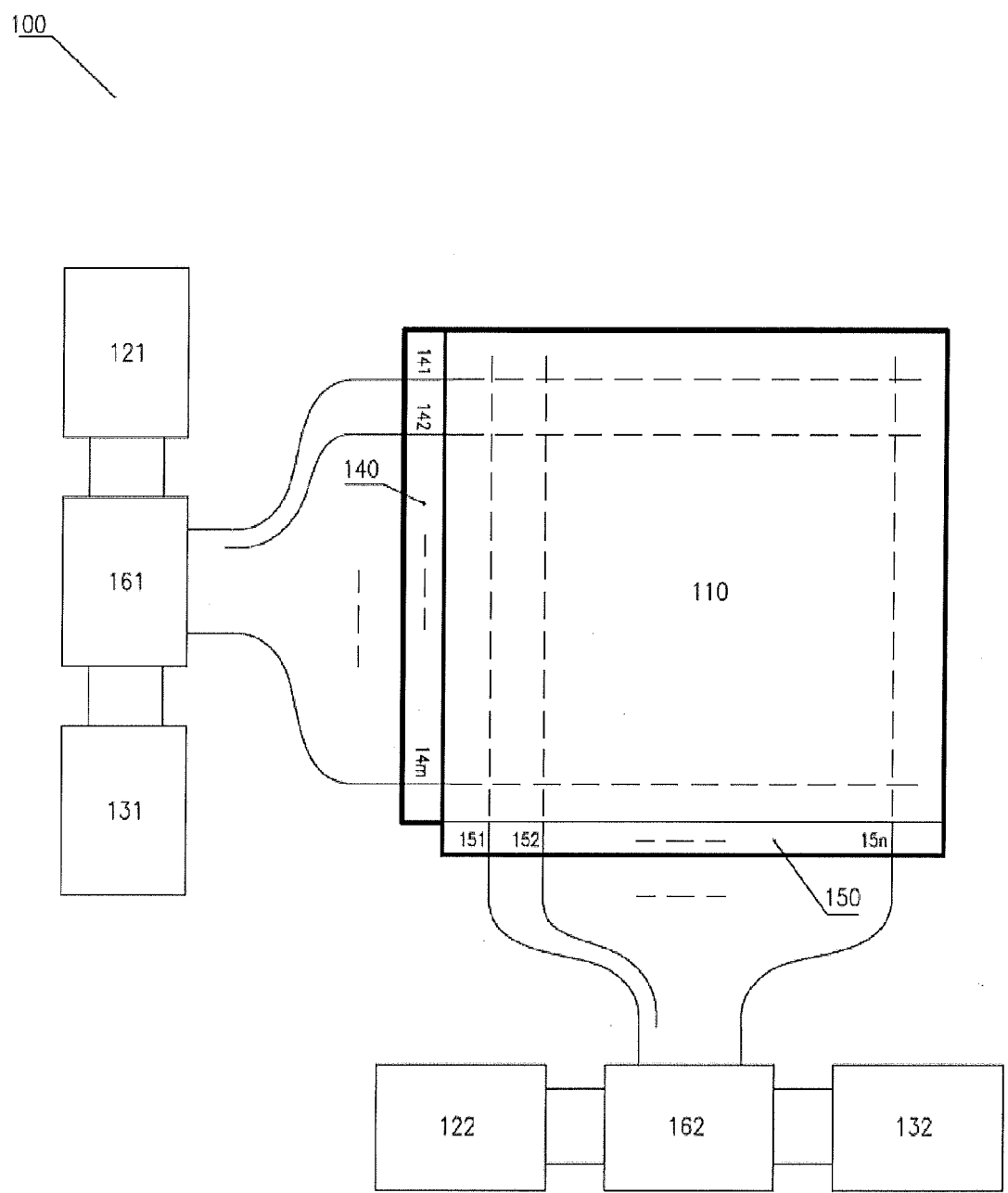
FIG. 1 is a schematic view of electrical connections of a first embodiment and a second embodiment according to the present invention.

Various types of flat panel display (FPD) are available, for example, liquid crystal displays (LCDs) include passive LCDs and active LCDs. In the passive LCD, such as a Twist Nematic LCD (TN-LCD) and a Super Twist Nematic LCD (STN-LCD), generally, display scan electrode lines or display signal electrode lines (that is, row electrode lines) are disposed on a lower substrate glass, display signal electrode lines or display scan electrode lines (that is, column electrode lines) are disposed on an upper substrate glass, and intersections thereof are display pixels. The active LCD, such as a Thin Film Transistor LCD (TFT-LCD), generally includes a TFT array, a display pixel array, display scan electrode lines (that is, row electrode lines) connected with a gate of the TFT, and display signal electrode lines (that is, column electrode lines) connected with a source or a drain of the TFT that are disposed on a substrate glass, and a color filter and a common electrode that are disposed on the other substrate glass. Other FPDs, such as a plasma display panel (PDP) and an active or passive organic light-emitting diode (PLED), also have display scan electrode lines and display signal electrode lines (that is, row and column electrode lines). In the present invention, row electrode lines and column electrode lines of the FPD are used for performing touch detection, and the display driving and the touch detection multiplex the electrodes of the display screen, such that the FPD realizes the touch detection while displaying normally.

As described above, when performing touch detection with the row electrode lines and column electrode lines of the FPD, if the touch signal is only applied to detecting lines, the effect of touch detection might be influenced due to crosstalk and other factors. The inventor has found several methods for eliminating the crosstalk, one of which is applying the touch signal to electrodes around the detecting line, such that the crosstalk signal is absorbed or blocked by the added touch signals. At this point, the electrodes around the detecting line and applied with the touch signal actually have shielding functions, such that the detecting line is avoided from being interfered. The electrodes around the detecting line and applied with the touch signal may be detecting lines or non-detecting lines.

In one method of applying the touch signal to the electrodes around the detecting line, the touch signal is applied to electrode lines being intersected with the detecting line.

In another method of applying the touch signal to the electrodes around the detecting line, the touch signal is applied to at least one electrode line not intersected with the detecting line at each side of the detecting line. This is adapted to the situation that the detecting line locates at the middle.

In another method of applying the touch signal to the electrodes around the detecting line, the touch signal is applied to at least one electrode line not intersected with the detecting line at the side of the detecting line having other electrode lines. This is adapted to the situation that the detecting line locates at an edge of the display screen. At this point, the detecting line only has one side having other electrode lines, and thus the touch signal only can be and should be applied to the electrode line at this side.

First Embodiment

Referring to FIG. 1, a touch screen FPD 100 includes a passive display screen 110, a row display driving circuit 121, a column display driving circuit 122, a row touch system circuit 131, a column touch system circuit 132, a row multiplexer 161, and a column multiplexer 162. The display screen 110 has a row electrode group 140 (including row electrode lines 141, 142, ..., 14m, in which m is a natural number larger than 1) and a column electrode group 150 (including column electrode lines 151, 152, ..., 15n, in which n is a natural number larger than 1). The row electrode group 140 of the display screen 110 is connected to the row display driving circuit 121 as well as the row touch system circuit 131, and the column electrode group 150 of the display screen 10 is connected to the column display driving circuit 122 as well as the column touch system circuit 132. The row multiplexer 161 and the column multiplexer 162 in the touch screen FPD enable electrodes of the display screen to be communicated with the display driving circuit so as to transmit display driving signals or to be communicated with the touch system circuit so as to transmit touch signals, and thus display driving and touch detection time-division multiplex the electrodes of the display screen.

The touch screen FPD is characterized by adopting time-division multiplex, in which one electrode line of the display screen is selected at a moment and applied with a touch signal, a change of the touch signal flowing through the detecting line is detected, and other electrode lines of the display screen are only applied with the touch signal without any detection. In a display time, the row multiplexer 161 and the column multiplexer 162 in the touch screen FPD 100 enable the row electrode group 140 and the column electrode group 150 of the display screen to be communicated with the row display driving circuit 121 and the column display driving circuit 122 respectively so as to transmit the display driving signals, and thus the display screen 110 is in a display state.

In a touch time, the row multiplexer 161 and the column multiplexer 162 in the touch screen FPD 100 enable the row electrode group 140 and the column electrode group 150 of the display screen to be communicated with the row touch system circuit 131 and the column touch system circuit 132 respectively so as to transmit the touch signals. The row touch system circuit 131 selects one electrode line from the row electrode lines 141, 142, . . . , 14M (M is a natural number larger than 1) as a row detecting line at one moment through scanning, a touch signal is applied to the electrode line and a change of the touch signal flowing through the electrode line is detected. Meanwhile, the row touch system circuit 131 also applies a touch signal identical to the touch signal applied to the detecting line to row electrode lines of all other non-detecting lines, the column touch system circuit 132 also applies a touch signal identical to the touch signal applied to the detecting line to all column electrode lines. The row electrode line, having the largest change of the touch signal flowing therethrough and exceeding a certain set threshold, is detected by the row touch system circuit 131 as a touched row electrode line. Thereafter, the column touch system circuit 132 selects one electrode line from the column electrode lines 151, 152, . . . , 15N (N is a natural number larger than 1) as a column detecting line at a moment through scanning, and a touch signal is applied to the electrode line and a change of the touch signal flowing through the electrode line is detected. Meanwhile, the column touch system circuit 132 also applies a touch signal identical to the touch signal applied to the detecting line to column electrode lines of all other non-detecting lines, and the row touch system circuit 131 also applies a touch signal identical to the touch signal applied to the detecting line to all row electrode lines. The column electrode line, having the largest change of the touch signal flowing therethrogh and exceeding a certain set threshold, is detected by the column touch system circuit 132 as a touched column electrode line. Therefore, a position of a touched point is thus determined according to a detected intersection of the touched row electrode line and the touched column electrode line.

The touch screen FPD 100 switches between the display time and the touch time, the display driving and touch detection time-division multiplex the electrodes of the display screen, and it is controlled that the every touch time does not exceed a response time of the FPD, and thus the FPD can be used for normal display as well as touch detection. Therefore, a touch screen FPD capable of recognizing m*n touch points is formed.

When applying the touch signal to the detecting line, the amplitude, phase, and frequency of the touch signal applied to the non-detecting lines may be adjusted to be different from the amplitude, phase, and frequency of the touch signal applied to the detecting line, so as to control the flowing direction of the touch signal more finely. The difference between the touch signal applied to the detecting line and the touch signal applied to the non-detecting line can be different amplitudes, phases, and frequencies, and can be one or two of the different amplitudes, phases, and frequencies.

When determining the touched electrode line, it is possible that the electrode line having the largest change of the touch signal flowing therethrough and exceeding a certain set threshold is not detected as the touched electrode line, but the electrode lines having changes of the touch signals flowing therethrough exceeding a certain set threshold are detected as the touched electrode lines, such that the touch screen FPD allows multi-touch at the same time.

The multiplexer enabling the electrodes of the display screen to be communicated with the display driving circuit so as to transmit the display driving signals or to be communicated with the touch system circuit so as to transmit the touch signals may be a multiple way analog switch, or another circuit functions as a multiplexer.

The line resistance of the electrode line of the display screen is preferably less than 50 KΩ, such that the difference between touch signals generated when a touch object approaches or contacts with two ends of the electrode line of the display screen is small enough for facilitating detection.

Second Embodiment

Referring to FIG. 1, the touch screen FPD 100 includes a passive display screen 110, a row display driving circuit 121, a column display driving circuit 122, a row touch system circuit 131, a column touch system circuit 132, a row multiplexer 161, and a column multiplexer 162. The display screen 110 has a row electrode group 140 (including row electrode lines 141, 142, . . . , 14$m$, in which m is a natural number larger than 1), and a column electrode group 150 (including column electrode lines 151, 152, . . . , 15$n$, in which n is a natural number larger than 1). The row electrode group 140 of the display screen 110 is connected to the row display driving circuit 121 as well as the row touch system circuit 131, and the column electrode group 150 of the display screen is connected to the column display driving circuit 122 as well as the column touch system circuit 132. The row multiplexer 161 and the column multiplexer 162 in the touch screen FPD enable the electrodes of the display screen to be communicated with the display driving circuit so as to transmit display driving signals or to be communicated with the touch system circuit so as to transmit touch signals, the display driving and touch detection time-division multiplex the electrodes of the display screen.

The touch screen FPD is characterized by adopting time-division multiplex, in which one electrode line of the display screen is selected at a moment and applied with a touch signal, a change of the touch signal flowing through the detecting line is detected, and other electrode lines of the display screen that are intersected with the detecting line are only applied with the touch signal without any detection. In a display time, the row multiplexer 161 and the column multiplexer 162 in the touch screen FPD 100 enable the row electrode group 140 and the column electrode group 150 of the display screen to be communicated with the row display driving circuit 121 and the column display driving circuit 122 respectively so as to transmit the display driving signals, and thus the display screen 110 is in a display state.

In a touch time, the row multiplexer 161 and the column multiplexer 162 in the touch screen FPD 100 enable the row electrode group 140 and the column electrode group 150 of the display screen to be communicated with the row touch system circuit 131 and the column touch system circuit 132 respectively so as to transmit the touch signals. The row touch system circuit 131 selects one electrode line from the row electrode lines 141, 142, . . . , 14M (M is a natural number larger than 1) as a row detecting line at one moment through scanning, a touch signal is applied to the electrode line, and a change of the touch signal flowing through the electrode line is detected. But, other row detecting lines are not applied with the touch signal.

Meanwhile, the column touch system circuit 132 applies a touch signal identical to the touch signal applied to the detecting line to all column electrode lines, and the row electrode line, having the largest change of the touch signal flowing therethrough and exceeding a certain set threshold, is detected by the row touch system circuit 131 as a touched row electrode line. Thereafter, the column touch system circuit 132 selects one electrode line from the column electrode lines 151, 152, . . . , 15N (N is a natural number larger than 1) as a column detecting line at a moment through scanning, a touch signal is applied to the electrode line, and a change of the touch signal flowing through the electrode line is detected. But, other column detecting lines are not applied with the touch signal. Meanwhile, the row touch system circuit 131 applies a touch signal identical to the touch signal applied to the detecting line to all row electrode lines, and the column electrode line, having the largest change of the touch signal flowing therethrogh and exceeding a certain set threshold, is detected by the column touch system circuit 132 as a touched column electrode line. Therefore, a position of a touched point is determined according to a detected intersection of the touched row electrode line and the touched column electrode line.

The touch screen FPD 100 switches between the display time and the touch time, the display driving and touch detection time-division multiplex the electrodes of the display screen, and it is controlled that the every touch time does not exceed a response time of the FPD, and thus the FPD can be used for normal display as well as touch detection. Therefore, a touch screen FPD capable of recognizing m*n touch points is formed.

When applying the touch signal to the detecting line, the amplitude, phase, and frequency of the touch signal applied to the non-detecting lines may be adjusted to be different from the amplitude, phase, and frequency of the touch signal applied to the detecting line, so as to control the flowing direction of the touch signal more finely. The difference between the touch signal applied to the detecting line and the touch signal applied to the non-detecting line can be different amplitudes, phases, and frequencies, and can be one or two of the different amplitudes, phases, and frequencies.

When determining the touched electrode line, it is possible that the electrode line having the largest change of the touch signal flowing therethrough and exceeding a certain set threshold is not detected as the touched electrode line, but the electrode lines having changes of the touch signals flowing there through exceeding a certain set threshold are detected as the touched electrode lines, such that the touch screen FPD allows multi-touch at the same time.

The multiplexer enabling the electrodes of the display screen to be communicated with the display driving circuit so as to transmit the display driving signals or to be communicated with the touch system circuit so as to transmit the touch signals may be a multiple way analog switch, or another circuit functions as a multiplexer.

The line resistance of the electrode line of the display screen is preferably less than 50 KΩ, such that the difference between touch signals generated when a touch object approaches or contacts with two ends of the electrode line of the display screen is small enough for facilitating detection.

Third Embodiment

Figure 2:
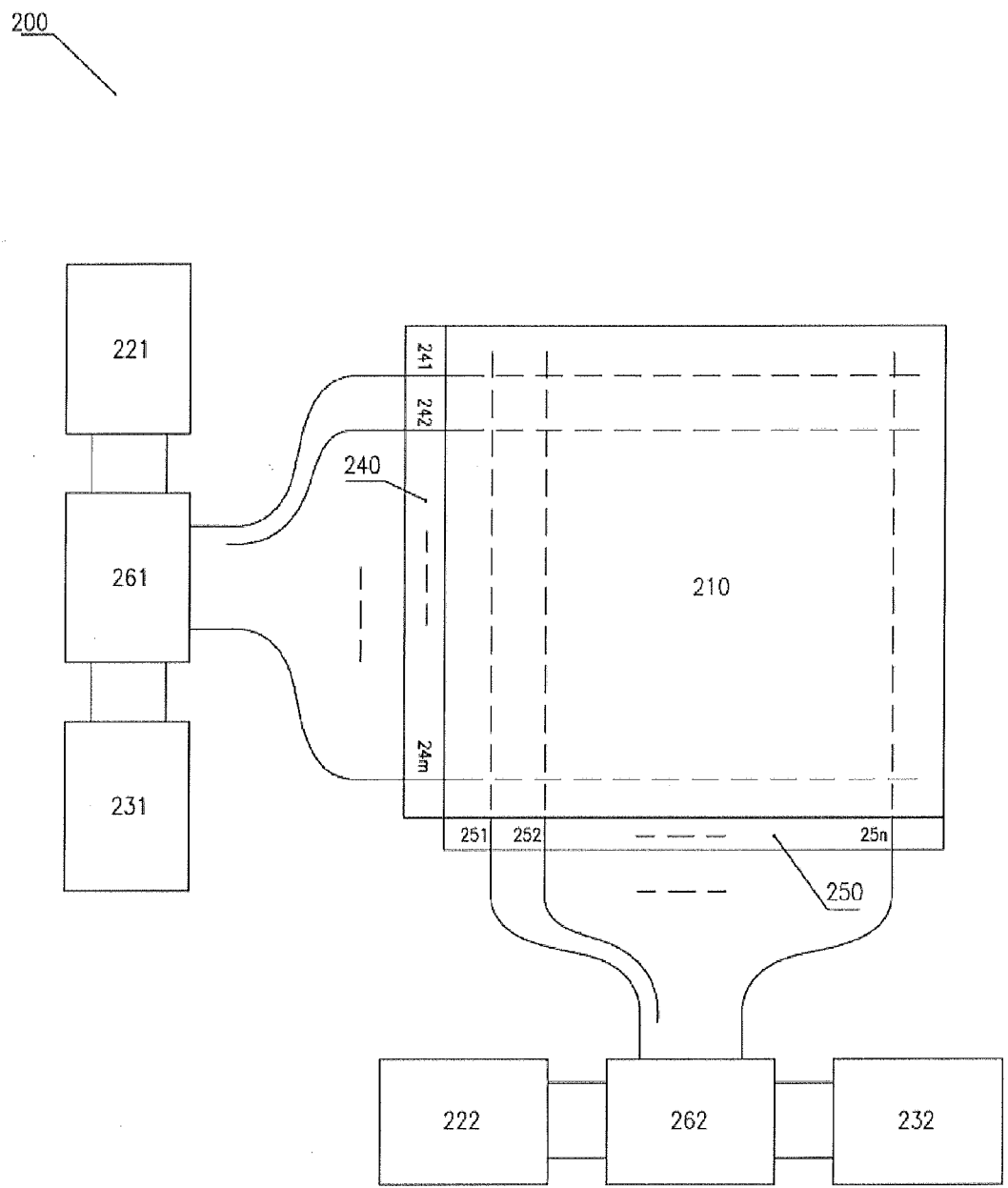
FIG. 2 is a schematic view of electrical connection of a third embodiment according to the present invention.

Referring to FIG. 2, a touch screen FPD 200 includes a passive display screen 210, a row display driving circuit 221, a column display driving circuit 222, a row touch system circuit 231, a column touch system circuit 232, a row signal loading and merge circuit 261, and a column signal loading and merge circuit 262. The display screen 210 has a row electrode group 240 (including row electrode lines 241, 242, . . . , 24m) and a column electrode group 250 (including column electrode lines 251, 252, . . . , 25n). The row electrode group 240 of the display screen 210 is connected to the row display driving circuit 221 as well as the row touch system circuit 231 through the row signal loading and merge circuit 261, and the column electrode group 250 is connected to the column display driving circuit 222 as well as the column touch system circuit 232 through the column signal loading and merge circuit 262. The signal loading and merge circuits in the touch screen FPD enable electrodes of the display screen to transmit display driving signals and touch signals simultaneously, and thus display driving and touch detection share the electrodes of the display screen at the same time.

The touch screen FPD is characterized by adopting simultaneous share, in which one electrode line of the display screen is selected at a moment and applied with a touch signal, a change of the touch signal flowing through the detecting line is detected, and other electrode lines of the display screen are only applied with the touch signal without any detection. The row touch system circuit 231 selects one electrode line from the row electrode lines 241, 242, . . . , 24m as a detecting line at one moment through scanning, the row signal loading and merge circuit 261 synthesizes a display driving signal generated by the row display driving circuit 221 and a touch signal having different features with the display driving signal and generated by the row touch system circuit 231 into a driving signal having touch recognition feature, applies the driving signal to the electrode line, and detects the change of the touch signal flowing through the electrode line. Meanwhile, the row signal loading and merge circuit 261 also applies the composite signal of the display driving signal and the touch signal to row electrode lines of all other non-detecting lines, in which the touch signal has the amplitude, phase, and frequency identical to those of the touch signal part in the signal applied to the detecting line. The column signal loading and merge circuit 262 applies the composite signal of the display driving signal generated by the column display driving circuit 222 and the touch signal generated by the column touch system circuit 232 to all column electrode lines, in which the touch signal has the amplitude, phase, and frequency identical to those of the touch signal part in the signal applied to the detecting line, and the row electrode line having the largest change of the touch signal flowing therethrough and exceeding a certain set threshold is detected by the row touch system circuit 231 as a touched row electrode line. Thereafter, column touch system circuit 232 selects one electrode line from the column electrode lines 251, 252, . . . , 25n as a detecting line at a moment through scanning, the column signal loading and merge circuit 262 synthesizes a display driving signal generated by the column display driving circuit 222 and a touch signal having different features with the display driving signal and generated by the column touch system circuit 232 into a driving signal having touch recognition features, applies the signal to the electrode line, and detects the change of the touch signal flowing through the electrode line. Meanwhile, the column signal loading and merge circuit 262 also applies the composite signal of the display driving signal and the touch signal to column electrode lines of all other non-detecting lines, in which the touch signal has the amplitude, phase, and frequency identical to those of the touch signal part in the signal applied to the detecting line. The row signal loading and merge circuit 261 applies the composite signal of the display driving signal generated by the row display driving circuit 221 and the touch signal generated by the row touch system circuit 231 to all row electrode lines, in which the touch signal has the amplitude, phase, and frequency identical to those of the touch signal part in the signal applied to the detecting line, and the column electrode line having the largest change of the touch signal flowing therethrough and exceeding a certain set threshold is detected by the column touch system circuit 232 as a touched column electrode line. Therefore, the position of a touched point is determined according to a detected intersection of the touched row electrode line and the touched column electrode line.

The display driving and the touch detection simultaneously share the electrodes of the display screen, and the electrodes of the display screen are used for display driving as well as the touch detection, such that the FPD can display normally while performing touch detection. Therefore, a touch screen FPD capable of recognizing m*n touch points is formed.

When applying the touch signal to the detecting line, the amplitude, phase, and frequency of the touch signal applied to the non-detecting lines may be adjusted to be different from the amplitude, phase, and frequency of the touch signal applied to the detecting line, so as to control the flowing direction of the touch signal more finely. The difference between the touch signal applied to the detecting line and the touch signal applied to the non-detecting line can be different amplitudes, phases, and frequencies, and can be one or two of the different amplitudes, phases, and frequencies.

When determining the touched electrode line, it is possible that the electrode line having the largest change of the touch signal flowing therethrough and exceeding a certain set threshold is not detected as the touched electrode line, but the electrode lines having changes of the touch signals flowing therethrough exceeding a certain set threshold are detected as the touched electrode lines, such that the touch screen FPD allows multi-touch at the same time.

The line resistance of the electrode line of the display screen is preferably less than 50 KΩ, such that the difference between touch signals generated when a touch object approaches or contacts with two ends of the electrode line of the display screen is small enough for facilitating detection.

Fourth Embodiment

Figure 3:
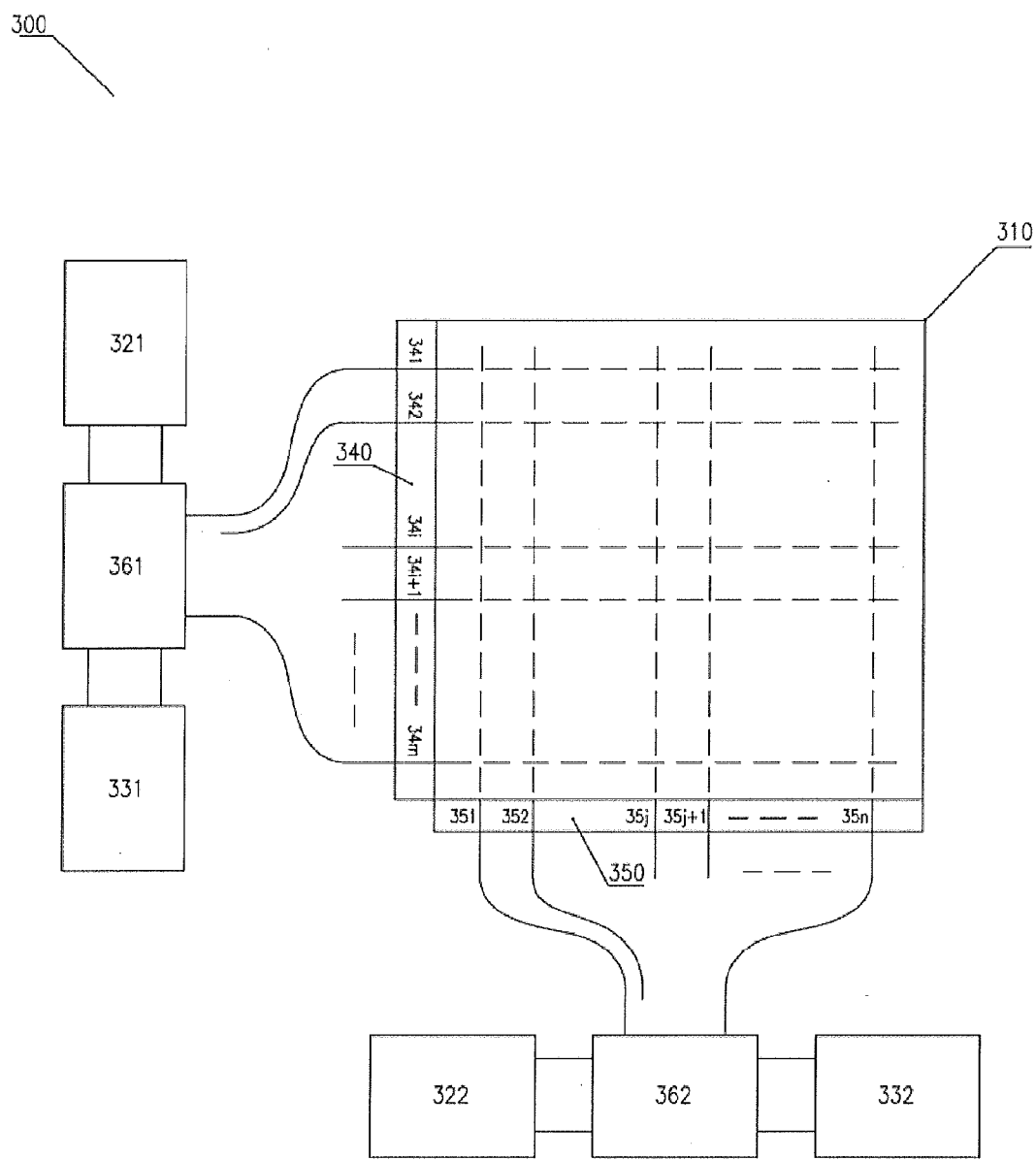
FIG. 3 is a schematic view of electrical connections of a fourth embodiment and a fifth embodiment according to the present invention.

Referring to FIG. 3, a touch screen FPD 300 includes a passive display screen 310, a row display driving circuit 321, a column display driving circuit 322, a row touch system circuit 331, a column touch system circuit 332, a row multiplexer 361, and a column multiplexer 362. The display screen 310 has a row electrode group 340 (including row electrode lines 341, 342, ..., 34i, 34i+1, ..., 34m, in which i is a natural number larger than 1, and m is a natural number larger than i) and a column electrode group 350 (including column electrode lines 351, 352, ..., 35j, 35j+1, ..., 35n, in which j is a natural number larger than 1, and n is a natural number larger than j). The row electrode group 340 of the display screen 310 is connected to the row display driving circuit 321 as well as the row touch system circuit 331, and the column electrode group 350 of the display screen 310 is connected to the column display driving circuit 322 as well as the column touch system circuit 332. The row multiplexer 361 and the column multiplexer 362 in the touch screen FPD enable the electrodes of the display screen to be communicated with the display driving circuit so as to transmit display driving signals or to be communicated with the touch system circuit so as to transmit touch signals, and display driving and touch detection time-division multiplex the electrodes of the display screen.

The touch screen FPD is characterized by adopting time-division multiplex, in which a group of electrode lines is selected at a moment and applied with a touch signal, the changes of the touch signals flowing through the detecting lines are detected, and other electrode lines of the display screen are only applied with the touch signal without any detection. Its the display time, the row multiplexer 361 and the column multiplexer 362 in the touch screen FPD 300 enable the row electrode group 340 and the column electrode group 350 of the display screen to be communicated with the row display driving circuit 321 and the column display driving circuit 322 respectively so as to transmit the display driving signals, and thus the display screen 310 is in a display state.

In the touch time, the row multiplexer 361 and the column multiplexer 362 in the touch screen FPD 300 enable the row electrode group 340 and the column electrode group 350 of the display screen to be communicated with the row touch system circuit 331 and the column touch system circuit 332 respectively so as to transmit the touch signals. The row touch system circuit 331 selects one electrode line from the row electrode lines 341, 342, ..., 34i as a detecting line at a moment through scanning and applies the touch signal to the detecting line, and selects another electrode line from the row electrode lines 34i+1, ..., 34m as a detecting line and applies the touch signal to the detecting line, and changes of the touch signals flowing through the two electrode lines are detected. Meanwhile, the row touch system circuit 331 also applies a touch signal having the amplitude, phase, and frequency identical to those of the touch signal to row electrode lines of all other non-detecting lines, the column touch system circuit 332 also applies a touch signal having the amplitude, phase, and frequency identical to those of the touch signal to all column electrode lines, and the row electrode line having the largest change of the touch signal flowing therethrough and exceeding a certain set threshold is detected by the row touch system circuit 331 from all the row electrode lines 341, 342, ... 34i, 34i+1, ..., 34m as a touched row electrode line. Thereafter, the column touch system circuit 332 selects one electrode line from the column electrode lines 351, 352, ..., 35j as a detecting line at a moment through scanning and applies a touch signal to the detecting line, and selects another electrode line from the column electrode lines 35j+1, ..., 35n as a detecting line and applies a touch signal to the detecting line, and changes of the touch signals respectively flowing through the two electrode lines are detected. Meanwhile, the column touch system circuit 332 also applies a touch signal having the amplitude, phase, and frequency identical to those of the touch signal to column electrode lines of all other non-detecting lines, the row touch system circuit 331 also applies a touch signal having the amplitude, phase, and frequency identical to those of the touch signal to all row electrode lines, and the column electrode line having the largest change of the touch signal flowing therethrough and exceeding a certain set threshold is detected by the column touch system circuit 332 from all the column electrode lines 351, 352, ..., 35j, 35j+1, ..., 35n as a touched column electrode line. Therefore, the position of a touched point is determined according to a detected intersection of the touched row electrode line and the touched column electrode line.

The touch screen FPD 300 switches between the display time and the touch time, the display driving and touch detection time-division multiplex the electrodes of the display screen, and it is controlled that the every touch time does not exceed a response time of the FPD, and thus the FPD can be used for normal display as well as touch detection. Therefore, a touch screen FPD capable of recognizing m*n touch points is formed.

In the touch time, the row touch system circuit 331 selects two electrode lines of the display screen as the detecting lines at the same time, and the touch detection is performed through scanning different blocks, thus reducing the time spent for detecting touch points on the whole display screen.

When applying the touch signal to the detecting line, the amplitude, phase, and frequency of the touch signal applied to the non-detecting lines may be adjusted to be different from the amplitude, phase, and frequency of the touch signal applied to the detecting line, so as to control the flowing direction of the touch signal more finely. The difference between the touch signal applied to the detecting line and the touch signal applied to the non-detecting line can be different amplitudes, phases, and frequencies, and can be one or two of the different amplitudes, phases, and frequencies.

When determining the touched electrode line, it is possible that the electrode line having the largest change of the touch signal flowing therethrough and exceeding a certain set threshold is not detected as the touched electrode line, but the electrode lines having changes of the touch signals flowing therethrough exceeding a certain set threshold are detected as the touched electrode lines, such that the touch screen FPD allows multi-touch at the same time.

The multiplexer enabling the electrodes of the display screen to be communicated with the display driving circuit so as to transmit the display driving signals or to be communicated with the touch system circuit so as to transmit the touch signals may be a multiple way analog switch, or another circuit functions as a multiplexer.

Fifth Embodiment

Referring to FIG. 3, a touch screen FPD 300 includes a passive display screen 310, a row display driving circuit 321, a column display driving circuit 322, a row touch system circuit 331, a column touch system circuit 332, a row multiplexer 361, and a column multiplexer 362. The display screen 310 has a row electrode group 340 (including row electrode lines 341, 342, 34$i$, 34$i$+1, . . . , 34$m$) and a column electrode group 350 (including column electrode lines 351, 352, . . . , 35$j$, 35$j$+1, . . . , 35$n$). The row electrode group 340 of the display screen 310 is connected to the row display driving circuit 321 as well as the row touch system circuit 331, and the column electrode group 350 of the display screen 310 is connected to the column display driving circuit 322 as well as the column touch system circuit 332. The row multiplexer 361 and the column multiplexer 362 in the touch screen FPD enable the electrodes of the display screen to be communicated with the display driving circuit so as to transmit display driving signals or to be communicated with the touch system circuit so as to transmit touch signals, and display driving and touch detection time-division multiplex the electrodes of the display screen.

The touch screen FPD is characterized by adopting time-division multiplex, in which a group of electrode lines is selected at a moment and applied with a touch signal, the change of the touch signal flowing through the detecting line is detected, and other electrode lines of the display screen are only applied with the touch signal without any detection. Detection is performed on upper and lower blocks at the same time. In the display time, the row multiplexer 361 and the column multiplexer 362 in the touch screen FPD 300 enable the row electrode group 340 and the column electrode group 350 of the display screen to be communicated with the row display driving circuit 321 and the column display driving circuit 322 respectively so as to transmit the display driving signals, and thus the display screen 310 is in a display state.

In the touch time, the row multiplexer 361 and the column multiplexer 362 in the touch screen FPD 300 enable the row electrode group 340 and the column electrode group 350 of the display screen to be communicated with the row touch system circuit 331 and the column touch system circuit 332 respectively so as to transmit the touch signals. The row touch system circuit 331 selects one electrode line from the row electrode lines 341, 342, . . . , 34$i$ as a detecting line at a moment through scanning and applies the touch signal to the detecting line, and selects another electrode line from the row electrode lines 34$i$+1, . . . , 34$m$ as a detecting line and applies the touch signal to the detecting line, and changes of the touch signals flowing through the two electrode lines are detected. Meanwhile, the row touch system circuit 331 also applies a touch signal having the amplitude, phase, and frequency identical to those of the touch signal to row electrode lines of all other non-detecting lines, the column touch system circuit 332 also applies a touch signal having the amplitude, phase, and frequency identical to those of the touch signal to all column electrode lines, the row electrode line having the largest change of the touch signal flowing therethrough and exceeding a certain set threshold is detected by the row touch system circuit 331 from all the row electrode lines 341, 342, . . . , 34$i$ as a touched row electrode line, and the row electrode line having the largest change of the touch signal flowing therethrough and exceeding a certain set threshold is also detected by the row touch system circuit 331 from all row electrode lines 34$i$+1, . . . , 34$m$ as a touched row electrode line. Thereafter, the column touch system circuit 332 selects one electrode line from the column electrode lines 351, 352, . . . , 35$j$, 35$j$+1, . . . 35$n$ as a detecting line at a moment through scanning and applies a touch signal to the detecting line, and the change of the touch signal flowing through the electrode line is detected. Meanwhile, the column touch system circuit 332 also applies a touch signal having the amplitude, phase, and frequency identical to those of the touch signal to column electrode lines of all other non-detecting lines, the row touch system circuit 331 also applies a touch signal having the amplitude, phase, and frequency identical to those of the touch signal to all row electrode lines, and the column electrode line having the largest change of the touch signal flowing therethrough and exceeding a certain set threshold is detected by the column touch system circuit 332 from all the column electrode lines 351, 352, . . . , 35$j$, 35$j$+1, . . . , 35$n$ as a touched column electrode line. Therefore, the position of a touched point is determined according to a detected intersection of the touched row electrode line and the touched column electrode line.

The touch screen FPD 300 switches between the display time and the touch time, the display driving and touch detection time-division multiplex the electrodes of the display screen, and it is controlled that the every touch time does not exceed a response time of the FPD, and thus the FPD can be used for normal display as well as touch detection. Therefore, a touch screen FPD, capable of recognizing i*n touch points and (m−i)*N touch points at upper and lower blocks of the display screen 310 with the row electrode line 34$i$ as a dividing line, is formed.

When applying the touch signal to the detecting line, the amplitude, phase, and frequency of the touch signal applied to the non-detecting lines may be adjusted to be different from the amplitude, phase, and frequency of the touch signal applied to the detecting line, so as to control the flowing direction of the touch signal more finely. The difference between the touch signal applied to the detecting line and the touch signal applied to the non-detecting line can be different amplitudes, phases, and frequencies, and can be one or two of the different amplitudes, phases, and frequencies.

The multiplexer enabling the electrodes of the display screen to be communicated with the display driving circuit so as to transmit the display driving signals or to be communicated with the touch system circuit so as to transmit the touch signals may be a multiple way analog switch, or another circuit functions as a multiplexer.

Sixth Embodiment

Figure 4:
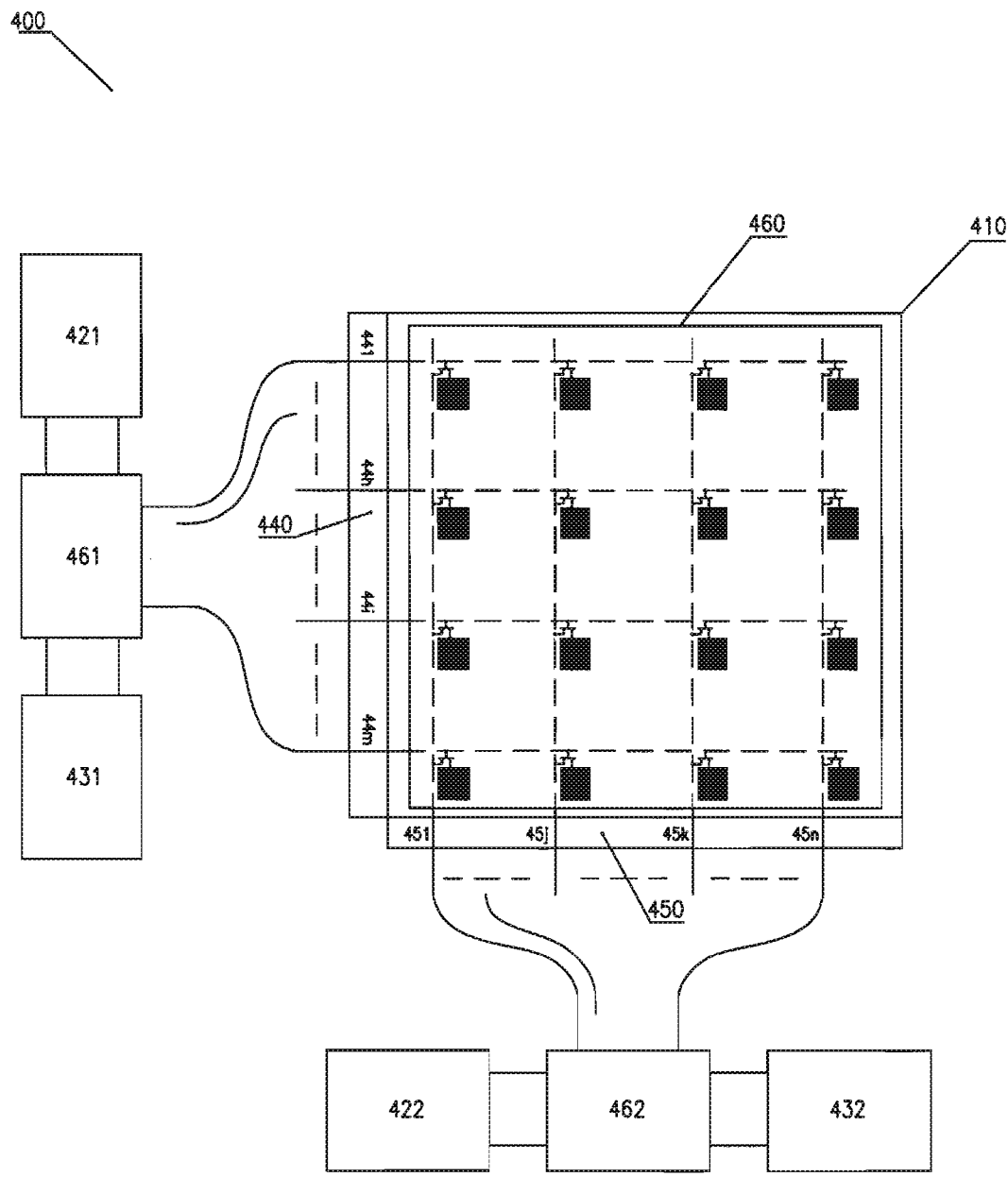
FIG. 4 is a schematic view of electrical connections of a six embodiment, a seventh embodiment, an eighth embodiment, and a ninth embodiment according to the present invention.

Referring to FIG. 4, a touch screen FPD 400 includes an active display screen 410, a row display driving circuit 421, a column display driving circuit 422, a common electrode display driving circuit, a row touch system circuit 431, a column touch system circuit 432, a common electrode touch system circuit, a row multiplexer 461, a column multiplexer 462, and a common electrode multiplexer. In the active display screen 410, a TFT array, a display pixel array, a display scan electrode group (that is, a row electrode group) 440 connected to a gate of the TFT, and a display signal electrode group (that is, a column electrode group) 450 connected to a source or drain of the TFT are disposed on an upper substrate glass closer to a user, and a color filter film and a common electrode 460 are disposed on a lower substrate glass. The row electrode group 440 has row electrode lines 441, . . . , 44$h$, . . . , 44$i$, 44$m$, and the column electrode group 450 has column electrode lines 451, . . . , 45$j$, . . . , 45$k$, . . . , 45$n$. The row electrode group 440 of the display screen 410 is connected to the row display driving circuit 421 as well as the row touch system circuit 431, the column electrode group 450 is connected to the column display driving circuit 422 as well as the column touch system circuit 432, and the common electrode 460 is connected to the common electrode display driving circuit as well as the common electrode touch system circuit. The row multiplexer 461, the column multiplexer 462, and the common electrode multiplexer in the touch screen FPD enable electrodes of the display screen to be communicated with the display driving circuit in display scan frames so as to transmit display driving signals, and to be communicated with the touch system circuit between display scan frames so as to transmit touch signals, and display driving and touch detection time-division multiplex the electrodes of the display screen.

The touch screen FPD is characterized by adopting time-division multiplex, in which one electrode line of the display screen is selected at a moment and applied with a touch signal, a change of the touch signal flowing through the detecting line is detected, other row and column electrode lines and the common electrode of the display screen are also applied with the touch signal. In the display scan frame, that is, in the display time, the row multiplexer 461, the column multiplexer 462, and the common electrode multiplexer in the touch screen FPD 400 enable the display screen row electrode group 440, the column electrode group 450, and the common electrode 460 to be communicated with the row display driving circuit 421, the column display driving circuit 422, and the common electrode display driving circuit respectively so as to transmit display driving signals, and thus the display screen 410 is in a display state.

Between display scan frames, that is, in the touch time, the row multiplexer 461, the column multiplexer 462 and the common electrode multiplexer in the touch screen FPD 400 enable the row electrode group 440, the column electrode group 450, and the common electrode 460 of the display screen to be communicated with the row touch system circuit 431, the column touch system circuit 432, and the common electrode touch system circuit so as to transmit touch signals. The row touch system circuit 431 selects one electrode line from the row electrode group 440 as a row detecting line each time in turn through scanning and applies a touch signal to the row detecting line, and the change of the touch signal flowing through the electrode line is detected. Meanwhile, the row touch system circuit 431 also applies a touch signal having the amplitude, phase, and frequency identical to those of the touch signal applied to the detecting line to other row electrode lines except for the row detecting line, the column touch system circuit 432 also applies a touch signal having the phase and frequency identical to but the amplitude different from the touch signal applied to the detecting line to all column electrode lines of the column electrode group 450, and the common electrode touch system circuit also applies a touch signal to the common electrode 460. The row electrode line having the largest change of the touch signal flowing therethrough and exceeding a certain set threshold is detected by the row touch system circuit 431 as a touched row electrode line. Thereafter, the column touch system circuit 432 selects one electrode line from the column electrode group 450 as a column detecting line each time in turn through scanning and applies a touch signal to the column detecting line, and a change of the touch signal flowing through the detection line is detected. Meanwhile, the column touch system circuit 432 applies a touch signal having the amplitude, phase, and frequency identical to those of the touch signal applied to the detecting line to other column electrode lines except for the column detecting line, the row touch system circuit 431 applies a touch signal having the phase and frequency identical to and the amplitude different from that of the touch signal applied to the detecting line to all row electrode lines, and the common electrode touch system circuit also applies a touch signal to the common electrode 460. The column electrode line having the largest change of the touch signal flowing therethrough and exceeding a certain set threshold is detected by the column touch system circuit 432 as a touched column electrode line. Therefore, the position of a touched point is determined according to a detected intersection of the touched row electrode line and the touched column electrode line.

The touch screen FPD 400 switches between the display time in display scan frames and the touch time between display scan frames repeatedly, and the display driving and the touch detection time-division multiplex the electrodes of the display screen, and thus the FPD can be used for normal display as well as touch detection. Therefore, a touch screen FPD capable of recognizing m*n touch points is formed.

When applying the touch signal to the detecting line, the amplitude, phase, and frequency of the touch signal applied to the non-detecting lines may be adjusted to be different from the amplitude, phase, and frequency of the touch signal applied to the detecting line, so as to control the flowing direction of the touch signal more finely. The difference between the touch signal applied to the detecting line and the touch signal applied to the non-detecting line can be different amplitudes, phases, and frequencies, and can be one or two of the different amplitudes, phases, and frequencies.

When determining the touched electrode line, it is possible that the electrode line having the largest change of the touch signal flowing therethrough and exceeding a certain set threshold is not detected as the touched electrode line, but the electrode lines having changes of the touch signals flowing therethrough exceeding a certain set threshold are detected as the touched electrode lines, such that the touch screen FPD allows multi-touch at the same time.

The multiplexer enabling the electrodes of the display screen to be communicated with the display driving circuit so as to transmit the display driving signals or to be communicated with the touch system circuit so as to transmit the touch signals may be a multiple way analog switch, or another circuit functions as a multiplexer.

The line resistance of the electrode line of the display screen is preferably less than 50 KΩ, such that the difference between touch signals generated when a touch object approaches or contacts with two ends of the electrode line of the display screen is small enough for facilitating detection.

Seventh Embodiment

Referring to FIG. 4, a touch screen FPD 400 includes an active display screen 410, a row display driving circuit 421, a column display driving circuit 422, a common electrode display driving circuit, a row touch system circuit 431, a column touch system circuit 432, a common electrode touch system circuit, a row multiplexer 461, a column multiplexer 462, and a common electrode multiplexer. In the active display screen 410, a TFT array, a display pixel array, a display scan electrode group (that is, a row electrode group) 440 connected to a gate of the TFT, and a display signal electrode group (that is, a column electrode group) 450 connected to a source or drain of the TFT are disposed on an upper substrate glass closer to a user, and a color filter film and a common electrode 460 are disposed on a lower substrate glass. The row electrode group 440 has row electrode lines 441, . . . , 44h, . . . , 44i, . . . , 44m, and the column electrode group 450 has column electrode lines 451, . . . , 45j, . . . , 45k, . . . , 45n. The row electrode group 440 of the display screen 410 is connected to the row display driving circuit 421 as well as the row touch system circuit 431, the column electrode group 450 is connected to the column display driving circuit 422 as well as the column touch system circuit 432, and the common electrode 460 is connected to the common electrode display driving circuit as well as the common electrode touch system circuit. The row multiplexer 461, the column multiplexer 462, and the common electrode multiplexer in the touch screen FPD enable electrodes of the display screen to be communicated with the display driving circuit in display scan frames so as to transmit display driving signals, and to be communicated with the touch system circuit between display scan frames so as to transmit touch signals, and display driving and touch detection time-division multiplex the electrodes of the display screen.

The touch screen FPD is characterized by adopting time-division multiplex, in which one electrode line of the display screen is selected at a moment and applied with a touch signal, a change of the touch signal flowing through the detecting line is detected, other electrode lines of the display screen in parallel with the detecting line are not applied with the touch signal, and electrode lines being intersected with the detecting line and the common electrode of the display screen are also applied with the touch signal. In the display scan frames, that is, in the display time, the row multiplexer 461, the column multiplexer 462, and the common electrode multiplexer in the touch screen FPD 400 enable the row electrode group 440, the column electrode group 450, and the common electrode 460 of the display screen to be communicated with the row display driving circuit 421, the column display driving circuit 422, and the common electrode display driving circuit respectively so as to transmit display driving signals, and thus the display screen 410 is in a display state.

Between the display scan frames, that is, in the touch time, the row multiplexer 461, the column multiplexer 462 and the common electrode multiplexer in the touch screen FPD 400 enable the row electrode group 440, the column electrode group 450, and the common electrode 460 of the display screen to be communicated with the row touch system circuit 431, the column touch system circuit 432, and the common electrode touch system circuit so as to transmit touch signals. The row touch system circuit 431 selects one electrode line from the row electrode lines 441, 44h, 44i, and 44m as a row detecting line each time in turn through scanning and applies a touch signal to the row detecting line, and the change of the touch signal flowing through the electrode line is detected. Meanwhile, the row touch system circuit 431 does not apply the touch signal to other row electrode lines except for the row detecting line, the column touch system circuit 432 applies a touch signal having the phase and frequency identical to and the amplitude different from the touch signal applied to the detecting line to all column electrode lines of the column electrode group 450, and the common electrode touch system circuit also applies a touch signal to the common electrode 460. The row electrode line having the largest change of the touch signal flowing therethrough and exceeding a certain set threshold is detected by the row touch system circuit 431 as a touched row electrode line. Thereafter, the column touch system circuit 432 selects one electrode line from the column electrode lines 451, 45j, 45k, and 45n as a column detecting line each time in turn through scanning and applies a touch signal to the column detecting line, and a change of the touch signal flowing through the detection line is detected. Meanwhile, the column touch system circuit 432 does not apply the touch signal to other column electrode lines except for the column detecting line, the row touch system circuit 431 applies a touch signal having the phase and frequency identical to and the amplitude different from that of the touch signal applied to the detecting line to all row electrode lines, and the common electrode touch system circuit also applies a touch signal to the common electrode 460. The column electrode line having the largest change of the touch signal flowing therethrough and exceeding a certain set threshold is detected by the column touch system circuit 432 as a touched column electrode line. Therefore, the position of a touched point is determined according to a detected intersection of the touched row electrode line and the touched column electrode line.

The touch screen FPD 400 switches between the display time in display scan frames and the touch time between display scan frames repeatedly, and the display driving and the touch detection time-division multiplex the electrodes of the display screen, and thus the FPD can be used for normal display as well as touch detection. Therefore, a touch screen FPD capable of recognizing 4*4 touch points is formed.

When applying the touch signal to the detecting line, the amplitude, phase, and frequency of the touch signal applied to the non-detecting lines may be adjusted to be different from the amplitude, phase, and frequency of the touch signal applied to the detecting line, so as to control the flowing direction of the touch signal more finely. The difference between the touch signal applied to the detecting line and the touch signal applied to the non-detecting line can be different amplitudes, phases, and frequencies, and can be one or two of the different amplitudes, phases, and frequencies.

When determining the touched electrode line, it is possible that the electrode line having the largest change of the touch signal flowing therethrough and exceeding a certain set threshold is not detected as the touched electrode line, but the electrode lines having changes of the touch signals flowing therethrough exceeding a certain set threshold are detected as the touched electrode lines, such that the touch screen FPD allows multi-touch at the same time.

The multiplexer enabling the electrodes of the display screen to be communicated with the display driving circuit so as to transmit the display driving signals or to be communicated with the touch system circuit so as to transmit the touch signals may be a multiple way analog switch, or another circuit functions as a multiplexer.

The line resistance of the electrode line of the display screen is preferably less than 50 KΩ, such that the difference between touch signals generated when a touch object approaches or contacts with two ends of the electrode line of the display screen is small enough for facilitating detection.

Eighth Embodiment

Referring to FIG. 4, a touch screen FPD 400 includes an active display screen 410, a row display driving circuit 421, a column display driving circuit 422, a common electrode display driving circuit, a row touch system circuit 431, a column touch system circuit 432, a common electrode touch system circuit, a row multiplexer 461, a column multiplexer 462, and a common electrode multiplexer. In the active display screen 410, a TFT array, a display pixel array, a display scan electrode group (that is, a row electrode group) 440 connected to a gate of the TFT, and a display signal electrode group (that is, a column electrode group) 450 connected to a source or drain of the TFT are disposed on an upper substrate glass closer to a user, and a color filter film and a common electrode 460 are disposed on a lower substrate glass. The row electrode group 440 has row electrode lines 441, ..., 44h, ..., 44i, ..., 44m, and the column electrode group 450 has column electrode lines 451, ..., 45j, ..., 45k, ..., 45n. The row electrode group 440 of the display screen 410 is connected to the row display driving circuit 421 as well as the row touch system circuit 431, and the column electrode group 450 is connected to the column display driving circuit 422 as well as the column touch system circuit 432. The row multiplexer 461 and the column multiplexer 462 in the touch screen FPD enable electrodes of the display screen to be communicated with the display driving circuit in display scan frames so as to transmit display driving signals, and to be communicated with the touch system circuit between display scan frames so as to transmit touch signals, and display driving and touch detection time-division multiplex the electrodes of the display screen.

The touch screen FPD is characterized by adopting time-division multiplex, in which several electrode lines of the display screen are selected at a moment and applied with a touch signal, changes of the touch signals flowing through the detecting lines are detected, other row and column electrode lines of the display screen are not applied with the touch signal, and the common electrode is applied with a touch signal. In the display scan frame, that is, in the display time, the row multiplexer 461, the column multiplexer 462, and the common electrode multiplexer in the touch screen FPD 400 enable the row electrode group 440, the column electrode group 450, and the common electrode 460 of the display screen to be communicated with the row display driving circuit 421, the column display driving circuit 422, and the common electrode display driving circuit respectively so as to transmit display driving signals, and thus the display screen 410 is in a display state.

Between the display scan frames, that is, in the touch time, the row multiplexer 461, the column multiplexer 462 and the common electrode multiplexer in the touch screen FPD 400 enable the row electrode group 440, the column electrode group 450, and the common electrode 460 of the display screen to be communicated with the row touch system circuit 431, the column touch system circuit 432, and the common electrode touch system circuit. The row touch system circuit 431 selects the row electrode lines 441, 44h, 44i, and 44m as four row detecting lines at the same time and applies four touch signals having identical amplitudes, phases, frequencies, or codes to the four detecting lines, and changes of the touch signals flowing through the detecting lines are detected. Moreover, the column touch system circuit 432 selects the column electrode lines 451, 45j, 45k, and 45n as four column detecting lines at the same time and applies touch signals having phases and frequencies identical to and amplitudes different from that of the touch signal applied to the row detecting line to the four column detecting lines, and changes of the touch signals flowing through the detecting lines are detected. Meanwhile, row and column electrode lines of all other non-detecting lines are not applied with the touch signal, and the common electrode touch system circuit also applies a touch signal to the common electrode 460. The row electrode line having the largest change of the touch signal flowing therethrough and exceeding a certain set threshold is detected by the row touch system circuit 431 from the four row detecting lines 441, 44h, 44i, and 44m as a touched row electrode line, and the column electrode line having the largest change of the touch signal flowing therethrough and exceeding a certain set threshold is detected by the column touch system circuit 432 from the four column detecting lines 451, 45j, 45k, and 45n as a touched column electrode line. Therefore, the position of a touched point is determined according to a detected intersection of the touched row electrode line and the touched column electrode line.

The touch screen FPD 400 switches between the display time in display scan frames and the touch time between display scan frames repeatedly, and the display driving and the touch detection time-division multiplex the electrodes of the display screen, and thus the FPD can be used for normal display as well as touch detection. Therefore, a touch screen FPD capable of recognizing 4*4 touch points is formed.

In the touch time, the row touch system circuit 431 and the column touch system circuit 432 respectively select four electrode lines of the display screen as the detecting lines and perform touch detection at the same time, thus shortening the time spent for detecting touched points on the whole display screen.

When applying the touch signal to the detecting line, the amplitudes, phases, frequencies, or codes of the touch signals applied to the detecting lines may be adjusted to be different, so as to control the flowing direction of the touch signal more finely. The difference between the touch signal applied to the detecting lines can be different amplitudes, phases, frequencies, or codes, and can be one or more of the different amplitudes, phases, frequencies, or codes.

When determining the touched electrode line, it is possible that the electrode line having the largest change of the touch signal flowing therethrough and exceeding a certain set threshold is not detected as the touched electrode line, but the electrode lines having changes of the touch signals flowing therethrough exceeding a certain set threshold are detected as the touched electrode lines, such that the touch screen FPD allows multi-touch at the same time.

The multiplexer enabling the electrodes of the display screen to be communicated with the display driving circuit so as to transmit the display driving signals or to be communicated with the touch system circuit so as to transmit the touch signals may be a multiple way analog switch, or another circuit functions as a multiplexer.

Ninth Embodiment

Referring to FIG. 4, a touch screen FPD 400 includes an active display screen 410, a row display driving circuit 421, a column display driving circuit 422, a common electrode display driving circuit, a row touch system circuit 431, a column touch system circuit 432, a common electrode touch system circuit, a row multiplexer 461, a column multiplexer 462, and a common electrode multiplexer. In the active display screen 410, a TFT array, a display pixel array, a display scan electrode group (that is, a row electrode group) 440 connected to a gate of the TFT, and a display signal electrode group (that is, a column electrode group) 450 connected to a source or drain of the TFT are disposed on an upper substrate glass closer to a user, and a color filter film and a common electrode 460 are disposed on a lower substrate glass. The row electrode group 440 has row electrode lines 441, 44h, 44i, . . . , 44m, and the column electrode group 450 has column electrode lines 451, . . . , 45j, . . . , 45k, . . . , 45n. The row electrode group 440 of the display screen 410 is connected to the row display driving circuit 421 as well as the row touch system circuit 431, the column electrode group 450 is connected to the column display driving circuit 422 as well as the column touch system circuit 432, and the common electrode 460 is connected to the common electrode display driving circuit as well as the common electrode touch system circuit. The row multiplexer 461 and the column multiplexer 462 in the touch screen FPD enable electrodes of the display screen to be communicated with the display driving circuit in display scan frames so as to transmit display driving signals, and to be communicated with the touch system circuit between display scan frames so as to transmit touch signals, and display driving and touch detection time-division multiplex the electrodes of the display screen.

The touch screen FPD is characterized by adopting time-division multiplex, in which a fixed number of row electrode lines and adjacent column electrode lines of the display screen are selected simultaneously each time and applied with the touch signal, changes of the touch signals flowing through the detecting lines are detected, other row and column electrode lines of the display screen are not applied with the touch signal, and the common electrode is applied with a touch signal. In the display scan frame, that is, in the display time, the row multiplexer 461, the column multiplexer 462, and the common electrode multiplexer in the touch screen FPD 400 enable the row electrode group 440, the column electrode group 450, and the common electrode 460 of the display screen to be communicated with the row display driving circuit 421, the column display driving circuit 422, and the common electrode display driving circuit respectively so as to transmit display driving signals, and thus the display screen 410 is in a display state. Between the display scan frames, that is, in the touch time, the row multiplexer 461 and the column multiplexer 462 in the touch screen FPD 400 enable the row electrode group 440 and the column electrode group 450 of the display screen to be connected to the row touch system circuit 431 and the column touch system circuit 432. The row touch system circuit 431 selects the row electrode lines 441, 44h, 44i, and 44m as four row detecting lines at the same time and applies four touch signals having identical amplitudes, phases, frequencies, or codes to the four detecting lines, and changes of the touch signals flowing through the detecting lines are detected. The column touch system circuit 432 selects the column electrode lines 451, 45j, 45k, and 45n as four column detecting lines at the same time and applies touch signals having phases and frequencies identical to and amplitudes different from that of the touch signal applied to the row detecting line to the four column detecting lines, and changes of the touch signals flowing through the detecting lines are detected. Row and column electrode lines of all other non-detecting lines are applied with the touch signal identical to that applied to the detecting line, and the common electrode touch system circuit also applies a touch signal to the common electrode 460. The row electrode line having the largest change of the touch signal flowing therethrough and exceeding a certain set threshold is detected by the row touch system circuit 431 from the four row detecting lines 441, 44h, 44i, and 44m as a touched row electrode line, and the column electrode line having the largest change of the touch signal flowing therethrough and exceeding a certain set threshold is detected by the column touch system circuit 432 from the four column detecting lines 451, 45j, 45k, and 45n as a touched column electrode line. Therefore, the position of a touched point is determined according to a detected intersection of the touched row electrode line and the touched column electrode line.

The touch screen FPD 400 switches between the display time in display scan frames and the touch time between display scan frames repeatedly, and the display driving and the touch detection time-division multiplex the electrodes of the display screen, and thus the FPD can be used for normal display as well as touch detection. Therefore, a touch screen FPD capable of recognizing 4*4 touch points is formed.

In the touch time, the row touch system circuit 431 and the column touch system circuit 432 respectively select four electrode lines of the display screen as the detecting lines and perform touch detection at the same time, thus shortening the time spent for detecting touched points on the whole display screen.

The amplitudes, phases, frequencies, or codes of the touch signals applied to the detecting lines may be adjusted to be different, so as to control the flow direction of the touch signal more finely. The difference of the touch signals applied to the detecting lines can be different amplitudes, phases, frequencies, or codes, and can be one or more of the different amplitudes, phases, frequencies, or codes.

When applying the touch signal to the detecting line, the amplitude, phase, frequency, or code of the touch signal applied to the non-detecting lines may be adjusted to be different from the amplitude, phase, frequency, or code of the touch signal applied to the detecting line, so as to control the flowing direction of the touch signal more finely. The difference between the touch signals applied to the electrodes can be different amplitudes, phases, frequencies, or codes, and can be one or more of the different amplitudes, phases, frequencies, or codes.

When determining the touched electrode line, it is possible that the electrode line having the largest change of the touch signal flowing therethrough and exceeding a certain set threshold is not detected as the touched electrode line, but the electrode lines having changes of the touch signals flowing therethrough exceeding a certain set threshold are detected as the touched electrode lines, such that the touch screen FPD allows multi-touch at the same time.

The multiplexer enabling the electrodes of the display screen to be communicated with the display driving circuit so as to transmit the display driving signals or to be communicated with the touch system circuit so as to transmit the touch signals may be a multiple way analog switch, or another circuit functions as a multiplexer.

Tenth Embodiment

Figure 5:
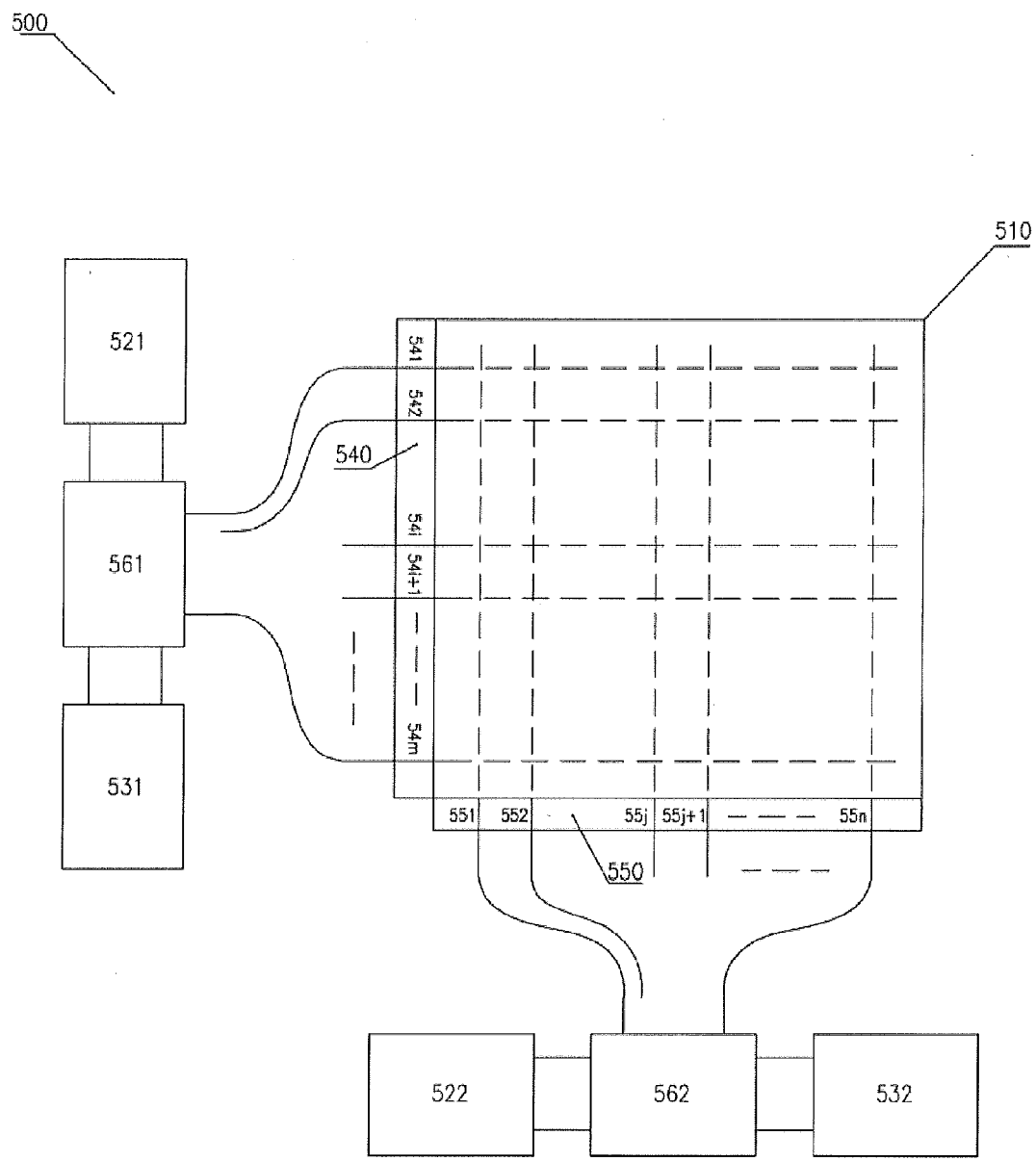
FIG. 5 is a schematic view of electrical connection of a tenth embodiment according to the present invention.

Referring to FIG. 5, a touch screen FPD 500 includes a passive display screen 510, a row display driving circuit 521, a column display driving circuit 522, a row touch system circuit 531, a column touch system circuit 532, a row signal loading and merge circuit 561, and a column signal loading and merge circuit 562. The display screen 510 has a row electrode group 540 (including row electrode lines 541, 542, ..., 54$i$, 54$i$+1, ..., 54$m$) and a column electrode group 550 (including column electrode lines 551, 552, ..., 55$j$, 55$j$+1, ..., 55$n$). The row electrode group 540 of the display screen 510 is connected to the row display driving circuit 521 as well as the row touch system circuit 531 through the row signal loading and merge circuit 561, and the column electrode group 550 of the display screen 510 is connected to the column display driving circuit 522 as well as the column touch system circuit 532 through the column signal loading and merge circuit 562. The signal loading and merge circuits in the touch screen FPD enable electrodes of the display screen to transmit display driving signals and touch signals at the same time, and thus display driving and touch detection share the electrodes of the display screen simultaneously.

The touch screen FPD is characterized by adopting simultaneous sharing, in which a group of separated electrode lines of the display screen is selected at a moment and applied with a touch signal, changes of the touch signals flowing through the detecting lines are detected, and other electrode lines of the display screen are only applied with the touch signal without any detection. The row touch system circuit 531 selects one electrode line from the row electrode lines 541, 542 ... 54$i$ as a detecting line and selects another electrode line from the row electrode lines 54$i$+1, ..., 54$m$ as a detecting line each time through scanning, the row signal loading and merge circuit 561 synthesizes a display driving signal generated by the row display driving circuit 521 and a touch signal having different features with the display driving signal and generated by the row touch system circuit 531 into a driving signal having touch recognition features, applies the driving signal to the two electrode lines, and detects changes of the touch signals respectively flowing through the two electrode lines. Meanwhile, the row signal loading and merge circuit 561 also applies the composite signal of the display driving signal and the touch signal to row electrode lines of all other non-detecting lines, in which the touch signal has the amplitude, phase, and frequency identical to those of the touch signal part in the signal applied to the detecting line. The column signal loading and merge circuit 562 applies the composite signal of the display driving signal generated by the column display driving circuit 522 and the touch signal generated by the column touch system circuit 532 to all column electrode lines, in which the touch signal has the amplitude, phase, and frequency identical to those of the touch signal part in the signal applied to the detecting line, and the row electrode line having the largest change of the touch signal and exceeding a certain set threshold is detected by the row touch system circuit 531 from all the row electrode lines 541, 542, ..., 54$i$, 54$i$+1, ..., 54$m$ as a touched row electrode line.

Thereafter, the column touch system circuit 532 selects one electrode line from the column electrode lines 551, 552, ..., 55$i$ as a detecting line and selects another electrode line from the column electrode lines 55$i$+1, ..., 55$m$ as a detecting line at a moment through scanning, the column signal loading and merge circuit 562 synthesizes a display driving signal generated by the column display driving circuit 522 and a touch signal having different features with the display driving signal and generated by the column touch system circuit 532 into a driving signal having touch recognition features, applies the driving signal to the two electrode lines, and detects the changes of the touch signals flowing through the electrode lines respectively. Meanwhile, the column signal loading and merge circuit 562 also applies the composite signal of the display driving signal and the touch signal to column electrode lines of all other non-detecting lines, in which the touch signal has the amplitude, phase, and frequency identical to those of the touch signal part in the signal applied to the detecting line. The row signal loading and merge circuit 561 applies the composite signal of the display driving signal generated by the row display driving circuit 521 and the touch signal generated by the row touch system circuit 531 to all row electrode lines, in which the touch signal has the amplitude, phase, and frequency identical to those of the touch signal part in the signal applied to the detecting line, and the column electrode line having the largest change of the touch signal flowing therethrough and exceeding a certain set threshold is detected by the column touch system circuit 532 from all the column electrode lines 551, 552, ..., 55$i$, 55$i$+1, ..., 55$m$ as a touched column electrode line. Therefore, the position of a touched point is determined according to a detected intersection of the touched row electrode line and the touched column electrode line.

The display driving and the touch detection simultaneously share the electrodes of the display screen, and the electrodes of the display screen are used for display driving as well as the touch detection, such that the FPD can display normally while performing touch detection. Therefore, a touch screen FPD capable of recognizing m*n touch points is formed.

When applying the touch signal to the detecting line, the amplitude, phase, and frequency of the touch signal applied to the non-detecting lines may be adjusted to be different from the amplitude, phase, and frequency of the touch signal applied to the detecting line, so as to control the flowing direction of the touch signal more finely. The difference between the touch signal applied to the detecting line and the touch signal applied to the non-detecting line can be different amplitudes, phases, and frequencies, and can be one or two of the different amplitudes, phases, and frequencies.

When determining the touched electrode line, it is possible that the electrode line having the largest change of the touch signal flowing therethrough and exceeding a certain set threshold is not detected as the touched electrode line, but the electrode lines having changes of the touch signals flowing therethrough exceeding a certain set threshold are detected as the touched electrode lines, such that the touch screen FPD allows multi-touch at the same time.

Eleventh Embodiment

Figure 6:
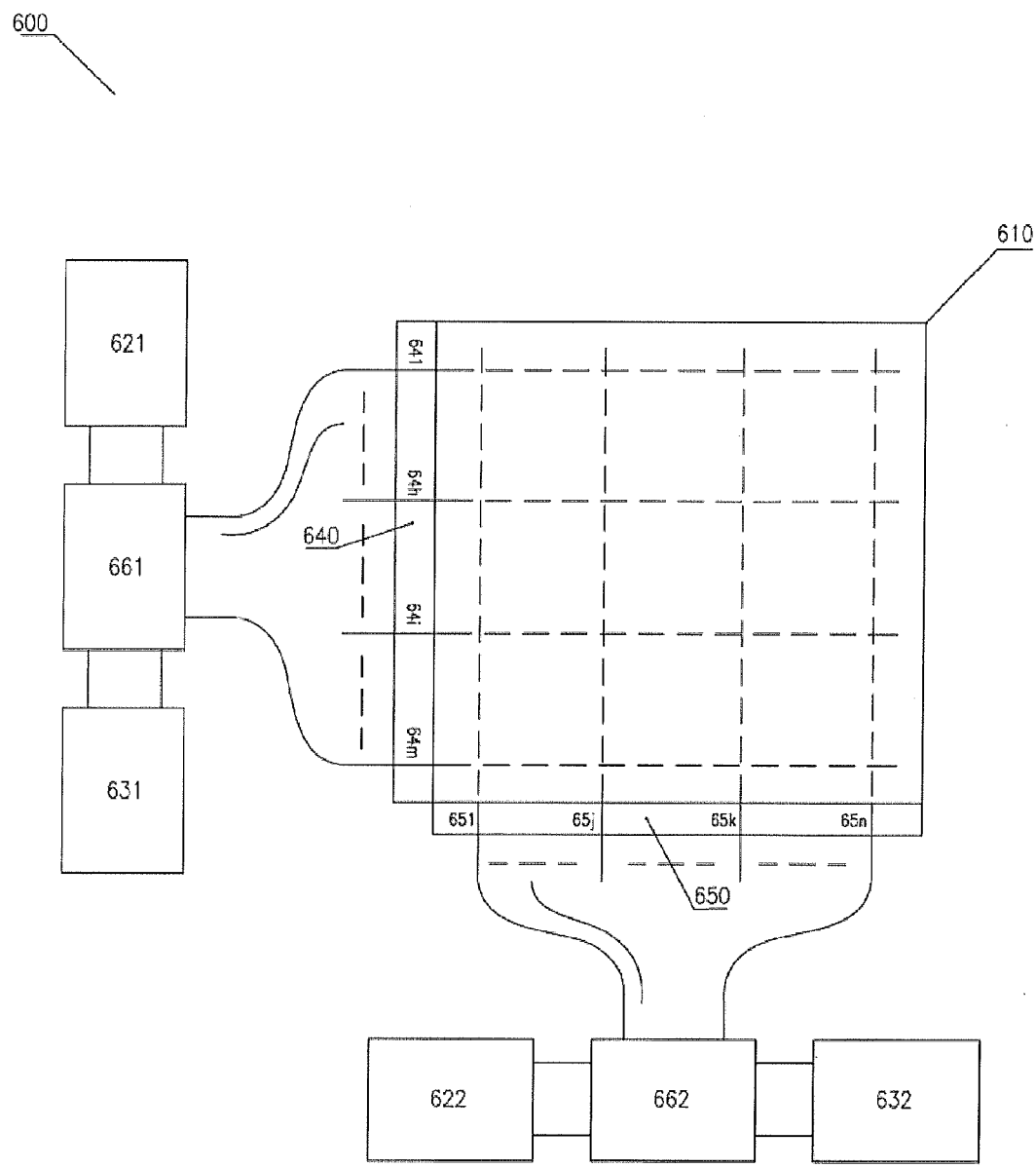
FIG. 6 is a schematic view of electrical connections of an eleventh embodiment and a twelfth embodiment according to the present invention.

Referring to FIG. 6, a touch screen FPD 600 includes a passive display screen 610, a row display driving circuit 621, a column display driving circuit 622, a row touch system circuit 631, a column touch system circuit 632, a row signal loading and merge circuit 661, and a column signal loading and merge circuit 662. The display screen 610 has a row electrode group 640 (including row electrode lines 641, ..., 64$h$, ..., 64$i$, ..., 64$m$) and a column electrode group 650 (including column electrode lines 651, ..., 65$j$, ..., 65$k$, ..., 65$n$). The row electrode group 640 of the display screen 610 is connected to the row display driving circuit 621 as well as the row touch system circuit 631 through the row signal loading and merge circuit 661, and the column electrode group 650 is connected to the column display driving circuit 622 as well as the column touch system circuit 632 through the column signal loading and merge circuit 662. The signal loading and merge circuits in the touch screen FPD enable electrodes of the display screen to transmit display driving signals and touch signals at the same time, and thus display driving and touch detection simultaneously share the electrodes of the display screen.

The touch screen FPD is characterized by adopting simultaneous sharing, in which a group of electrode lines of the display screen is selected at a moment and applied with a touch signal, changes of the touch signals flowing through the detecting lines are detected, and other electrode lines of the display screen are only applied with the touch signal without any detection. The row touch system circuit 631 selects the row electrode lines 641, 64h, 64i, and 64m as four detecting lines at the same time, the row signal loading and merge circuit 661 synthesizes a display driving signal generated by the row display driving circuit 621 and a touch signal having different features with the display driving signal and generated by the row touch system circuit 631 into a driving signal having touch recognition features, applies the driving signal to the four electrode lines, and detects changes of the touch signals respectively flowing through the four electrode lines. The row signal loading and merge circuit 661 also applies the composite signal of the display driving signal and the touch signal to row electrode lines of all other non-detecting lines, in which the touch signal has the amplitude, phase, and frequency identical to those of the touch signal part in the signal applied to the detecting line. The column signal loading and merge circuit 662 applies the composite signal of the display driving signal generated by the column display driving circuit 622 and the touch signal generated by the column touch system circuit 632 to all column electrode lines, in which the touch signal has the amplitude, phase, and frequency identical to those of the touch signal part in the signal applied to the detecting line. The row electrode line having the largest change of the touch signal and exceeding a certain set threshold is detected by the row touch system circuit 631 from the four row electrode lines 641, 64h, 64i, and 64m as a touched row electrode line.

Thereafter, column touch system circuit 632 selects the column electrode lines 651, 65j, 65k, and 65n as four detecting lines at the same time, the column signal loading and merge circuit 662 synthesizes a display driving signal generated by the column display driving circuit 622 and a touch signal having different features with the display driving signal and generated by the column touch system circuit 632 into a driving signal having touch recognition features, applies the driving signal to the four electrode lines, and detects the changes of the touch signals flowing through the four electrode lines respectively. The column signal loading and merge circuit 662 also applies the composite signal of the display driving signal and the touch signal to column electrode lines of all other non-detecting lines, in which the touch signal has the amplitude, phase, and frequency identical to those of the touch signal part in the signal applied to the detecting line. The row signal loading and merge circuit 661 applies the composite signal of the display driving signal generated by the row display driving circuit 621 and the touch signal generated by the row touch system circuit 631 to all row electrode lines, in which the touch signal has the amplitude, phase, and frequency identical to those of the touch signal part in the signal applied to the column detecting line. The column electrode line having the largest change of the touch signal flowing therethrough and exceeding a certain set threshold is detected by the column touch system circuit 632 from the four column electrode lines 651, 65j, 65k, and 65n as a touched column electrode line. Therefore, the position of a touched point is determined according to a detected intersection of the touched row electrode line and the touched column electrode line.

The display driving and the touch detection simultaneously share the electrodes of the display screen, and the electrodes of the display screen are used for display driving as well as the touch detection, such that the FPD can display normally while performing touch detection. Therefore, a touch screen FPD capable of recognizing 4*4 touch points is formed.

Amplitudes, phases, frequencies, or codes of the touch signals applied to the detecting lines may be adjusted to be different, so as to control the flowing direction of the touch signal more finely. The difference between the touch signals applied to the detecting lines can be different amplitudes, phases, frequencies, or codes, and may be one or more of the different amplitudes, phases, frequencies, or codes.

When applying the touch signal to the detecting line, the amplitude, phase, frequency, or code of the touch signal applied to the non-detecting lines may be adjusted to be different from the amplitude, phase, frequency, or code of the touch signal applied to the detecting line, so as to control the flowing direction of the touch signal more finely. The difference between the touch signals applied to the electrodes can be different amplitudes, phases, frequencies, or codes, and can be one or more of the different amplitudes, phases, frequencies, or codes.

When determining the touched electrode line, it is possible that the electrode line having the largest change of the touch signal flowing therethrough and exceeding a certain set threshold is not detected as the touched electrode line, but the electrode lines having changes of the touch signals flowing therethrough exceeding a certain set threshold are detected as the touched electrode lines, such that the touch screen FPD allows multi-touch at the same time.

Twelfth Embodiment

Referring to FIG. 6, a touch screen FPD 600 includes a passive display screen 610, a row display driving circuit 621, a column display driving circuit 622, a row touch system circuit 631, a column touch system circuit 632, a row signal loading and merge circuit 661, and a column signal loading and merge circuit 662. The display screen 610 has a row electrode group 640 (including row electrode lines 641, . . . , 64h, . . . , 64i, . . . , 64m) and a column electrode group 650 (including column electrode lines 651, . . . , 65j, . . . , 65k, . . . , 65n). The row electrode group 640 of the display screen 610 is connected to the row display driving circuit 621 as well as the row touch system circuit 631 through the row signal loading and merge circuit 661, and the column electrode group 650 is connected to the column display driving circuit 622 as well as the column touch system circuit 632 through the column signal loading and merge circuit 662. The signal loading and merge circuits in the touch screen FPD enable electrodes of the display screen to transmit display driving signals and touch signals at the same time, and thus display driving and touch detection simultaneously share the electrodes of the display screen.

The touch screen FPD is characterized by adopting simultaneous sharing, in which several rows of and several columns of electrode lines of the display screen are selected at a moment and applied with a touch signal, changes of the touch signals flowing through the detecting lines are detected, and other electrode lines of the display screen are only applied with a display driving signal instead of the touch signal. The row touch system circuit 631 selects the row electrode lines 641, 64h, 64i, and 64m as four detecting lines, the row signal loading and merge circuit 661 synthesizes a display driving signal generated by the row display driving circuit 621 and a touch signal having different features with the display driving signal and generated by the row touch system circuit 631 into a driving signal having touch recognition features, applies the driving signal to the four electrode lines, and detects changes of the touch signals respectively flowing through the four electrode lines. The row signal loading and merge circuit 661 applies the display driving signal instead of the touch signal to row electrode lines of all other non-detecting lines. Meanwhile, the column touch system circuit 632 selects the column electrode lines 651, 65j, 65k, and 65n as four detecting lines respectively, the column signal loading and merge circuit 662 synthesizes a display driving signal generated by the column display driving circuit 622 and a touch signal having different features with the display driving signal and generated by the column touch system circuit 632 into a driving signal having touch recognition features, applies the driving signal to the four electrode lines, and detects the changes of the touch signals flowing through the four electrode lines respectively. The column signal loading and merge circuit 662 applies the display driving signal instead of the touch signal to column electrode lines of all other non-detecting lines. The row electrode line having the largest change of the touch signal and exceeding a certain set threshold is detected by the row touch system circuit 631 from the four row electrode lines 641, 64h, 64i, and 64m as a touched row electrode line. The column electrode line having the largest change of the touch signal flowing therethrough and exceeding a certain set threshold is detected by the column touch system circuit 632 from the four column electrode lines 651, 65j, 65k, and 65n as a touched column electrode line. Therefore, the position of a touched point is determined according to a detected intersection of the touched row electrode line and the touched column electrode line.

The display driving and the touch detection simultaneously share the electrodes of the display screen, and the electrodes of the display screen are used for display driving as well as the touch detection, such that the FPD can display normally while performing touch detection. Therefore, a touch screen FPD capable of recognizing 4*4 touch points is formed.

Amplitudes, phases, frequencies, or codes of the touch signals applied to the detecting lines may be adjusted to be different, so as to control the flowing direction of the touch signal more finely. The difference between the touch signals applied to the detecting lines can be different amplitudes, phases, frequencies, or codes, and may be one or more of the different amplitudes, phases, frequencies, or codes.

When determining the touched electrode line, it is possible that the electrode line having the largest change of the touch signal flowing therethrough and exceeding a certain set threshold is not detected as the touched electrode line, but the electrode lines having changes of the touch signals flowing therethrough exceeding a certain set threshold are detected as the touched electrode lines, such that the touch screen FPD allows multi-touch at the same time.

The description on the content above is detailed illustration of the present invention through the preferred embodiments, and cannot be considered as the limitation of the present invention. Those of ordinary skill in the art can make various simple deduction or replacement without departing from the spirit of the present invention, which all fall within the protection scope of the present invention.

What is claimed is:

1. A touch screen flat panel display (FPD), comprising a display screen, a display driving circuit, a touch system circuit, and a multiplexer or a signal loading and merge circuit enabling electrodes of the display screen to be used for display driving as well as touch detection; wherein the multiplexer enables the electrodes of the display screen to be communicated with the display driving circuit for transmitting display driving signals or to be communicated with the touch system circuit for transmitting touch signals, and the display driving and the touch detection time-division multiplex the electrodes of the display screen; the signal loading and merge circuit enables the electrodes of the display screen to transmit the display driving signals and the touch signals simultaneously, and the display driving and the touch detection share the electrodes of the display screen simultaneously; wherein:

during a period that the electrodes of the display screen transmit the touch signals, the touch signals are applied to more than two electrode lines of the display screen at least one moment, the touch system circuit selects at least one electrode line of the display screen having shielding protection as a detecting line from them; when the touch signal is applied to the detecting line, a change of the touch signal flowing through the electrode is also detected; the electrode line of the display screen having the shielding protection refers to an electrode line of the display screen having electrode lines at two adjacent sides or two non-adjacent sides applied with the touch signal or intersected electrode lines applied with the touch signal, and wherein when the touch signal is applied to the detecting line, the same touch signal is also applied to non-detecting lines around the detecting line to provide shielding functions.

2. The touch screen FPD according to claim 1, wherein:
the electrode lines of the display screen comprise all electrodes of the display screen including row electrode lines and column electrode lines of a passive display screen, or row electrode lines and column electrode lines of an active display screen.

3. The touch screen FPD according to claim 2, wherein when the touch signal is applied to at one least of the row electrode lines as the detecting line, the touch signal is also applied to the remaining row electrode lines as non-detecting lines, and when the touch signal is applied to at one least of the column electrode lines as the detecting line, the touch signal is also applied to the remaining column electrode lines as non-detecting lines.

4. The touch screen FPD according to claim 1, wherein:
during the period that the touch signal is applied to the electrodes of the display screen, when applying the touch signal on the detecting line and detecting the change of the touch signal flowing through the detecting line, the touch signal is also applied to other electrodes of the display screen being intersected with the detecting line; and the other electrodes of the display screen being intersected with the detecting line are all electrodes being intersected with the detecting line or a part of the electrodes being intersected with the detecting line.

5. The touch screen FPD according to claim 1, wherein:
during the period that the touch signal is applied to the electrodes of the display screen, when applying the touch signal on the detecting line and detecting the change of the touch signal flowing through the detecting line, the touch signal is also applied to other electrodes of the display screen not intersected with the detecting line; and the other electrodes of the display screen not intersected with the detecting line are all electrodes not intersected with the detecting line or a part of the electrodes not intersected with the detecting line.

6. The touch screen FPD according to claim 1, wherein: during the period that the touch signal is applied to the electrodes of the display screen, when applying the touch signal on the detecting line and detecting the change of the touch signal flowing through the detecting line, the touch signal is also applied to other electrodes of the display screen being or not intersected with the detecting line; and the other electrodes of the display screen being or not intersected with the detecting line are all electrodes being or not intersected with the detecting line or a part of the electrodes being or not intersected with the detecting line.

7. The touch screen FPD according to claim 1, wherein: during the period that the touch signal is applied to the electrodes of the display screen, when applying the touch signal on the detecting line and detecting the change of the touch signal flowing through the detecting line, the touch signal is also applied to a common electrode of the display screen.

8. The touch screen FPD according to claim 1, wherein: the touch signal is an alternating current (AC) signal including zero amplitude or a direct current (DC) signal including zero potential.

9. The touch screen FPD according to claim 1, wherein: when the touch system circuit selects the detecting lines, the touch system circuit selects a part of the electrode lines of the display screen at the same time as a group of detecting lines.

10. The touch screen FPD according to claim 9, wherein: the touch system circuit selects the detecting lines in a scanning manner, and selects different parts of the electrode lines of the display screen at different times as the detecting lines.

11. The touch screen FPD according to claim 9, wherein: each group of detecting lines is composed of one or more electrode lines of the display screen.

12. The touch screen FPD according to claim 1, wherein: when the touch system circuit selects the detecting lines, the touch system circuit selects two or more parts of the electrode lines of the display screen at the same time as two or more groups of detecting lines respectively, the touch signal is applied to each group of detecting lines simultaneously, and the changes of the touch signals flowing through each group of detecting lines are detected.

13. The touch screen FPD according to claim 12, wherein: the touch system circuit selects the detecting lines in a scanning manner, and selects different parts of the electrode lines of the display screen at different times as the detecting lines.

14. The touch screen FPD according to claim 12, wherein: each group of detecting lines is composed of one or more electrode lines of the display screen.

15. A touch screen flat panel display (FPD), comprising a display screen, a display driving circuit, a touch system circuit, and a multiplexer or a signal loading and merge circuit enabling electrodes of the display screen to be used for display driving as well as touch detection; wherein the multiplexer enables the electrodes of the display screen to be communicated with the display driving circuit for transmitting display driving signals or to be communicated with the touch system circuit for transmitting touch signals, and the display driving and the touch detection time-division multiplex the electrodes of the display screen; the signal loading and merge circuit enables the electrodes of the display screen to transmit the display driving signals and the touch signals simultaneously, and the display driving and the touch detection share the electrodes of the display screen simultaneously; wherein:
during a period that the electrodes of the display screen transmit the touch signals, the touch signals are applied to more than two electrode lines of the display screen at least one moment, the touch system circuit selects at least one electrode line of the display screen having shielding protection as a detecting line from them; when the touch signal is applied to the detecting line, a change of the touch signal flowing through the electrode is also detected; the electrode line of the display screen having the shielding protection refers to an electrode line of the display screen having electrode lines at two adjacent sides or two non-adjacent sides applied with the touch signal or intersected electrode lines applied with the touch signal,
wherein the touch signals applied to the electrodes have the same frequency or code, and
wherein when the touch signal is applied to the detecting line, the same touch signal is also applied to non-detecting lines around the detecting line to provide shielding functions.

16. A touch screen flat panel display (FPD), comprising a display screen, a display driving circuit, a touch system circuit, and a multiplexer or a signal loading and merge circuit enabling electrodes of the display screen to be used for display driving as well as touch detection; wherein the multiplexer enables the electrodes of the display screen to be communicated with the display driving circuit for transmitting display driving signals or to be communicated with the touch system circuit for transmitting touch signals, and the display driving and the touch detection time-division multiplex the electrodes of the display screen; the signal loading and merge circuit enables the electrodes of the display screen to transmit the display driving signals and the touch signals simultaneously, and the display driving and the touch detection share the electrodes of the display screen simultaneously; wherein:
during a period that the electrodes of the display screen transmit the touch signals, the touch signals are applied to more than two electrode lines of the display screen at least one moment, the touch system circuit selects at least one electrode line of the display screen having shielding protection as a detecting line from them; when the touch signal is applied to the detecting line, a change of the touch signal flowing through the electrode is also detected; the electrode line of the display screen having the shielding protection refers to an electrode line of the display screen having electrode lines at two adjacent sides or two non-adjacent sides applied with the touch signal or intersected electrode lines applied with the touch signal,
wherein the touch signals applied to the electrodes have the same frequency or code,
wherein the electrode lines of the display screen comprise all electrodes of the display screen including row electrode lines and column electrode lines of a passive display screen, or row electrode lines and column electrode lines of an active display screen, and
wherein when the touch signal is applied to at one least of the row electrode lines as the detecting line, the same touch signal is also applied to the remaining row electrode lines as non-detecting lines, and when the touch signal is applied to at one least of the column electrode lines as the detecting line, the same touch signal is also applied to the remaining column electrode lines as non-detecting lines.

* * * * *